United States Patent
Isaji et al.

(10) Patent No.: US 7,322,333 B2
(45) Date of Patent: Jan. 29, 2008

(54) INTERNAL COMBUSTION ENGINE AIR INTAKE STRUCTURE

(75) Inventors: Hiroshi Isaji, Yokohama (JP); Kouichi Mori, Ayase (JP); Shunichi Mitsuishi, Isehara (JP); Kimiyoshi Nishizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 187 days.

(21) Appl. No.: 11/214,781

(22) Filed: Aug. 31, 2005

(65) Prior Publication Data

US 2006/0048738 A1 Mar. 9, 2006

(30) Foreign Application Priority Data

| Sep. 6, 2004 | (JP) | ............................. 2004-258463 |
| Sep. 7, 2004 | (JP) | ............................. 2004-259650 |
| Sep. 8, 2004 | (JP) | ............................. 2004-260624 |
| Sep. 8, 2004 | (JP) | ............................. 2004-261419 |

(51) Int. Cl.
*F02M 35/10* (2006.01)
(52) U.S. Cl. ............................. 123/184.59; 123/184.51
(58) Field of Classification Search ............ 123/198 E, 123/306, 308, 184.21, 184.23, 184.27, 184.35, 123/184.36, 184.37, 184.42, 184.43, 184.45, 123/184.48, 184.51, 184.59, 188.14
See application file for complete search history.

(56) References Cited

U.S. PATENT DOCUMENTS

| 4,271,795 A | * | 6/1981 | Nakagawa et al. ......... 123/308 |
| 4,323,038 A | * | 4/1982 | Motosugi et al. ...... 123/188.14 |
| 4,465,034 A | * | 8/1984 | Tsutsumi ..................... 123/306 |
| 4,543,931 A | * | 10/1985 | Hitomi et al. ............... 123/308 |
| 4,612,903 A | * | 9/1986 | Urabe et al. ................. 123/432 |
| 5,273,014 A | | 12/1993 | Mitobe et al. |
| 5,295,464 A | | 3/1994 | Ando et al. |
| 5,551,392 A | | 9/1996 | Yamaji et al. |
| 5,592,917 A | | 1/1997 | Kim |
| 5,632,244 A | * | 5/1997 | Endres et al. ............... 123/306 |
| 5,640,941 A | | 6/1997 | Hazen et al. |
| 6,394,066 B1 | | 5/2002 | Chou et al. |
| 6,575,133 B2 | | 6/2003 | Ries-Mueller et al. |
| 6,705,280 B1 | * | 3/2004 | Lippert ........................ 123/306 |

(Continued)

FOREIGN PATENT DOCUMENTS

JP 5-57319 U 7/1993

(Continued)

*Primary Examiner*—Stephen Kirk Cronin
(74) *Attorney, Agent, or Firm*—Global IP Counselors, LLP

(57) ABSTRACT

An air intake structure is provided with an air intake control valve disposed in the air intake passage. The air intake control valve has a valve element pivotally mounted at one end adjacent to a passage wall of the air intake passage. The air intake control valve is configured to control a gas flow based on the rotational position of the valve element. At least one horizontal partitioning plate extends along the flow direction of an intake air. The horizontal partitioning plate can be stationary or moveable with the valve element. Optionally, the valve element has a swirl-producing notch and a vertical partitioning plate extends substantially perpendicular to the horizontal partitioning plate from a position corresponding to a vertical side edge of the swirl-producing notch when the air intake control valve is fully closed. The vertical partitioning plate can be stationary or moveable with the valve element.

15 Claims, 17 Drawing Sheets

U.S. PATENT DOCUMENTS

| | | |
|---|---|---|
| 6,712,038 B2 | 3/2004 | Hiraku et al. |
| 6,761,140 B2 * | 7/2004 | Herold et al. .......... 123/188.14 |
| 6,805,087 B2 * | 10/2004 | Yakabe et al. ......... 123/184.25 |
| 6,827,060 B2 | 12/2004 | Huh |
| 6,874,465 B2 * | 4/2005 | Arimatsu et al. ........... 123/306 |
| 7,089,909 B2 | 8/2006 | Moschini et al. |
| 2005/0155570 A1 | 7/2005 | Confer et al. |
| 2006/0048738 A1 | 3/2006 | Isaji et al. |

FOREIGN PATENT DOCUMENTS

| | | |
|---|---|---|
| JP | 5-71445 U | 9/1993 |
| JP | 5-87255 U | 11/1993 |
| JP | 7-25264 U | 5/1995 |

* cited by examiner

INTERNAL COMBUSTION ENGINE AIR INTAKE STRUCTURE

CROSS-REFERENCE TO RELATED APPLICATIONS

This application claims priority under 35 U.S.C. § 119 to Japanese Patent Application Nos. 2004-258463, 2004-259650, 2004-260624 and 2004-261419. The entire disclosures of Japanese Patent Application Nos. 2004-258463, 2004-259650, 2004-260624 and 2004-261419 are hereby incorporated herein by reference.

BACKGROUND OF THE INVENTION

1. Field of the Invention

The present invention generally relates to an air intake structure for an internal combustion engine. More specifically, the present invention relates to an internal combustion engine air intake structure that includes an air control valve for changing the cross sectional area of an air intake passage.

2. Background Information

One known method of producing tumbling of the fuel-air mixture in a reliable manner is to provide a partition wall inside a passageway of an intake port to divide the passage into a first passage and a second passage and provide an air intake control valve (shutter valve) that can open and close the second passage. When the air intake control valve is closed, the outer edge of the air intake control valve touches against the partition wall and deflects the intake air to flow through the first passage, thereby causing a tumbling motion to occur. An example of an air intake structure employing such arrangement is disclosed in Japanese Laid-Open Patent Publication No. 7-25264.

In view of the above, it will be apparent to those skilled in the art from this disclosure that there exists a need for an improved air intake structure for an internal combustion engine. This invention addresses this need in the art as well as other needs, which will become apparent to those skilled in the art from this disclosure.

SUMMARY OF THE INVENTION

It has been discovered that since the device described in the aforementioned publication only has one partition wall, the air intake control valve can only be used in one of two different valve states: a state in which the second passage is fully open and a state in which the second passage is fully closed. Consequently, it is difficult to obtain gas flows of various strengths based on the operating conditions of the engine.

The present invention was conceived in view of this problem and its object is to provide an air intake structure that can obtain gas flows of various strengths by varying the opening degree of the air intake control valve and can ensure that the gas flow obtained is stable regardless of the opening degree to which the air intake control valve is set.

In order to achieve the object, the present invention is provided with an internal combustion engine air intake structure that basically comprises an air intake passage, an air intake control valve and an intake air flow partitioning unit. The air intake passage has an internal passage wall defining an open cross sectional area of the air intake passage in a plane perpendicular to an intake air flow direction. The air intake control valve is disposed in the air intake passage to selectively move between at least a retracted position, a first intake air deflecting position and a second intake air deflecting position. The cross sectional area of the air intake passage is effectively reduced in the first and second intake air deflecting positions relative to the retracted position to increase flow of intake air on a combustion chamber side of the air intake control valve in the air intake passage. The intake air flow partitioning unit is disposed in the air intake passage and arranged to cooperate with the air intake control valve to at least selectively maintain a first substantially constant reduced cross sectional area downstream of the air intake control valve when the air intake control valve is in the first intake air deflecting position, and a second substantially constant reduced cross sectional area when the air intake control valve is in the second intake air deflecting position. The first and second substantially constant reduced cross sectional areas are in a range of one half or less of the open cross sectional area of the air intake passage.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

Figure 9:
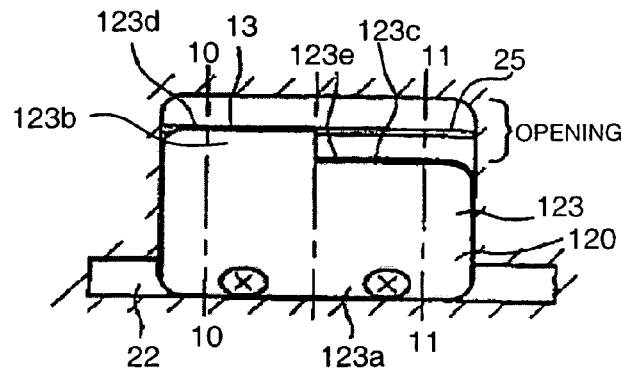
FIG. 9 is an enlarged, simplified transverse cross sectional view of a portion of an air intake passage in FIGS. 6 to 8 in accordance with the third embodiment of the present invention.
Figure 10:
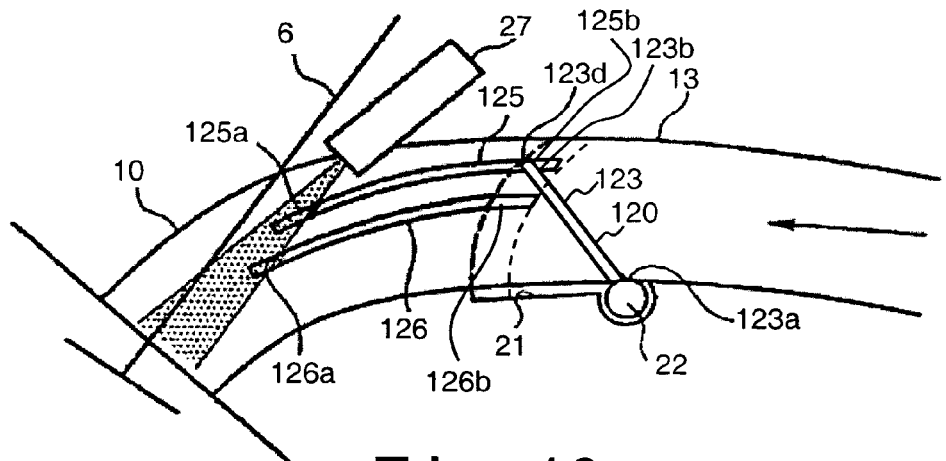
FIG. 10 is a simplified longitudinal cross sectional view of the portion of the air intake passage illustrated in FIGS.
Figure 11:
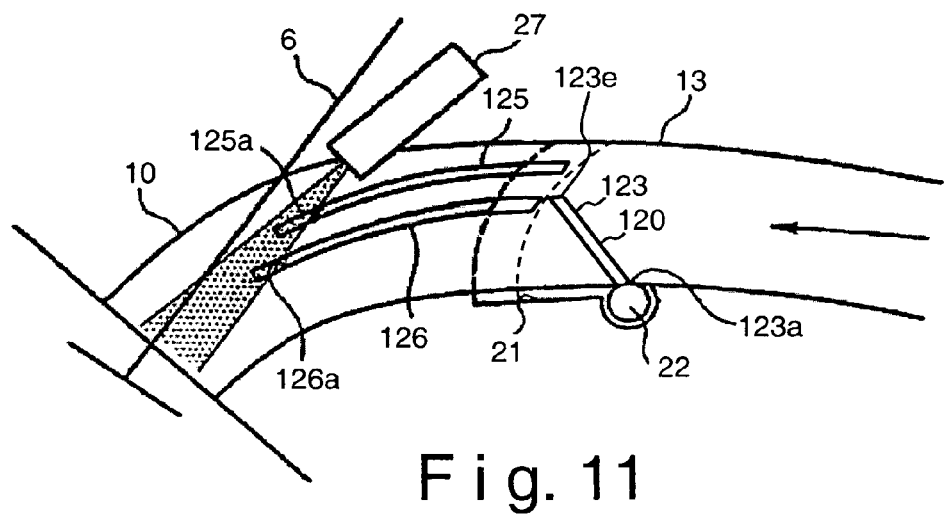
Figure 12:
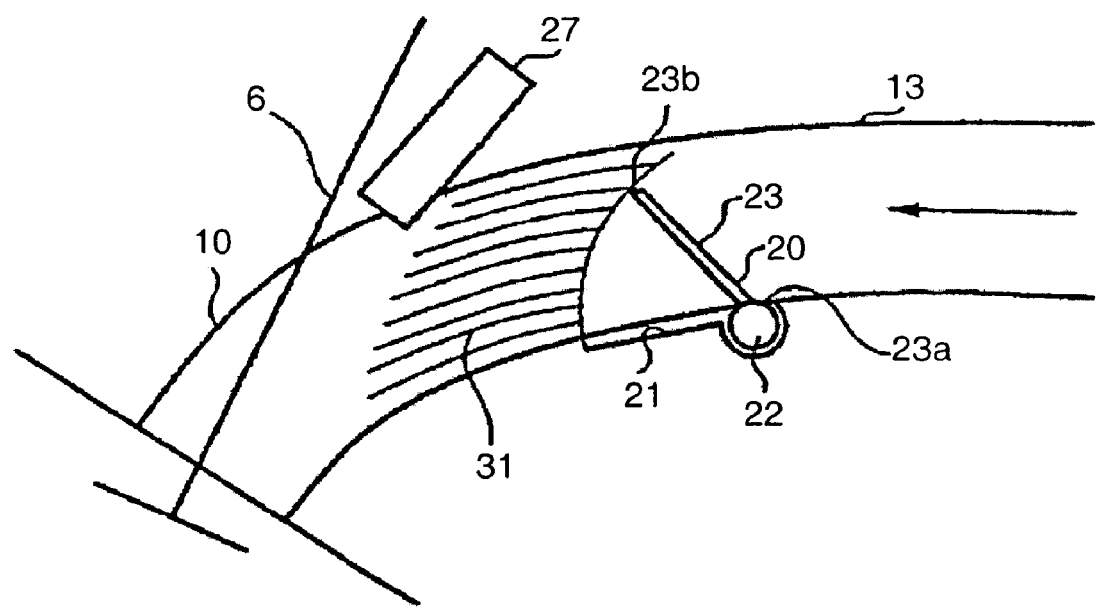
Figure 13:
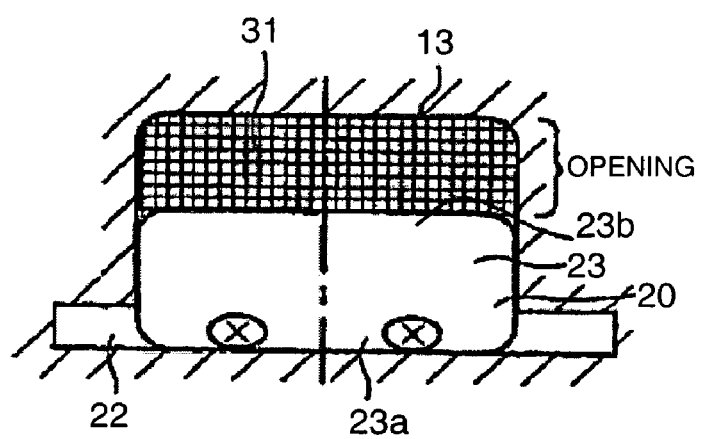
Figure 14:
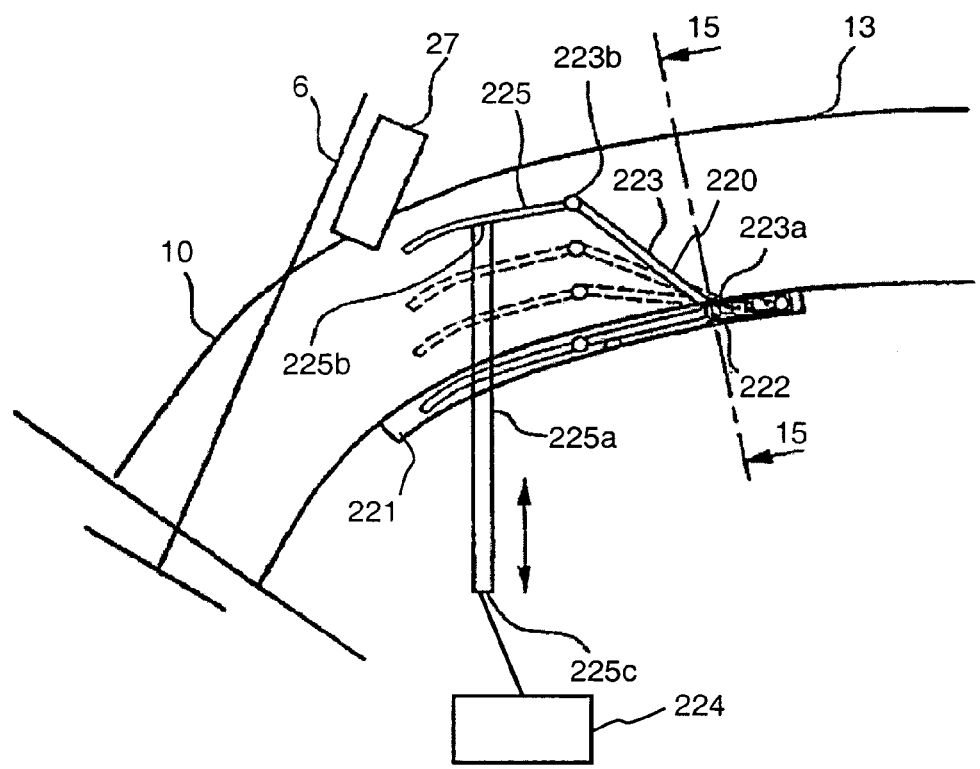
Figure 15:
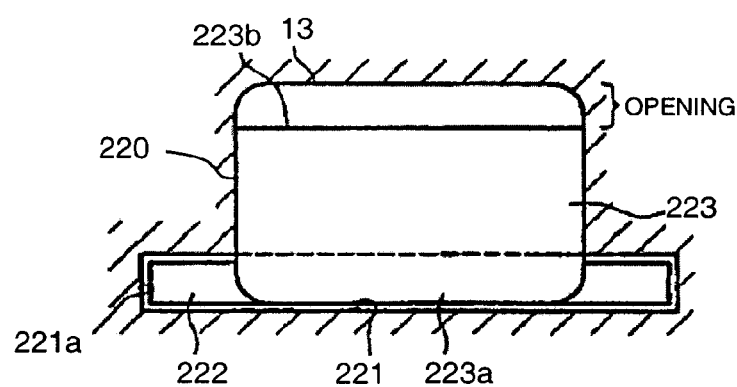
Figure 16:
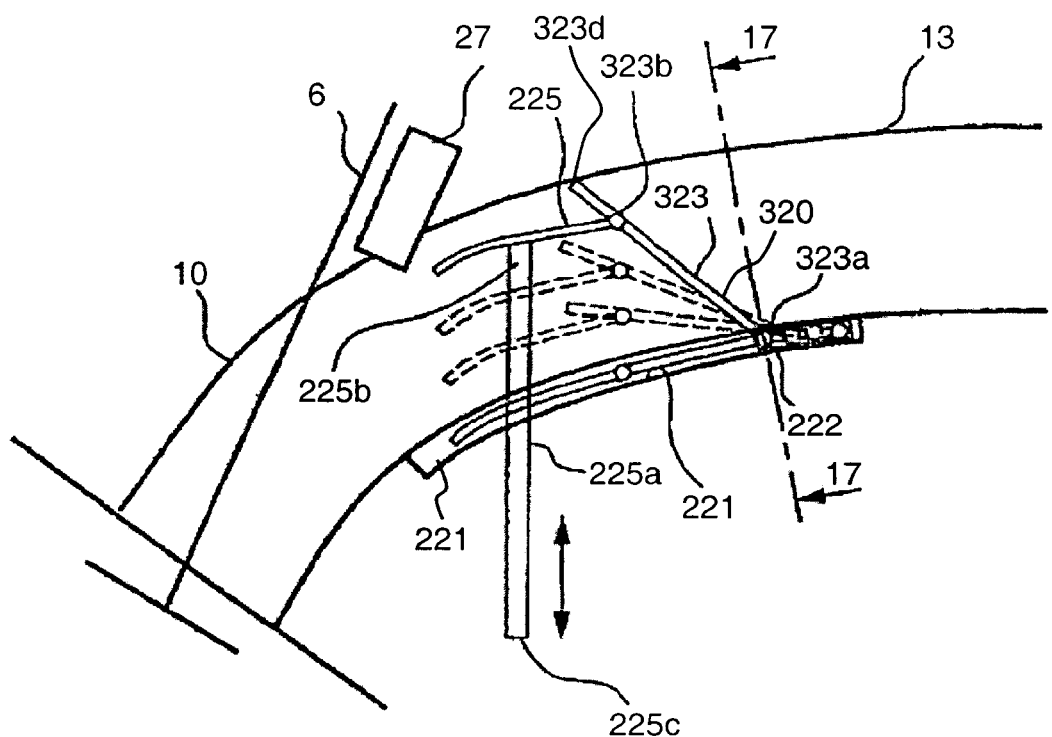
Figure 17:
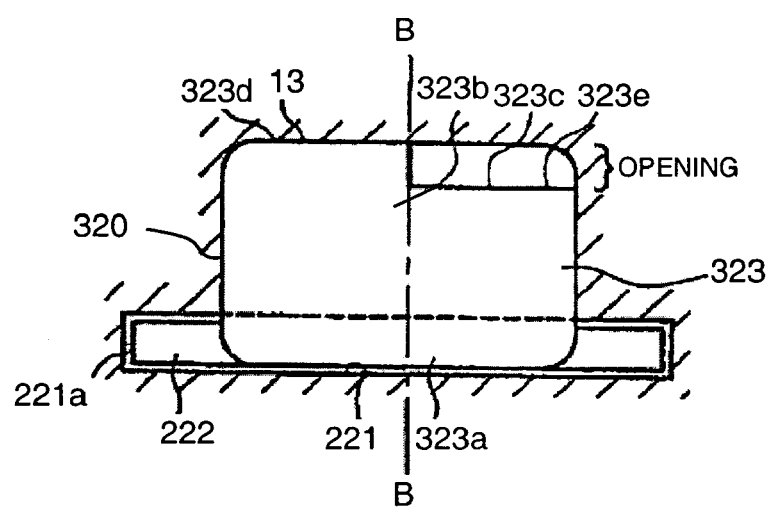
Figure 18:
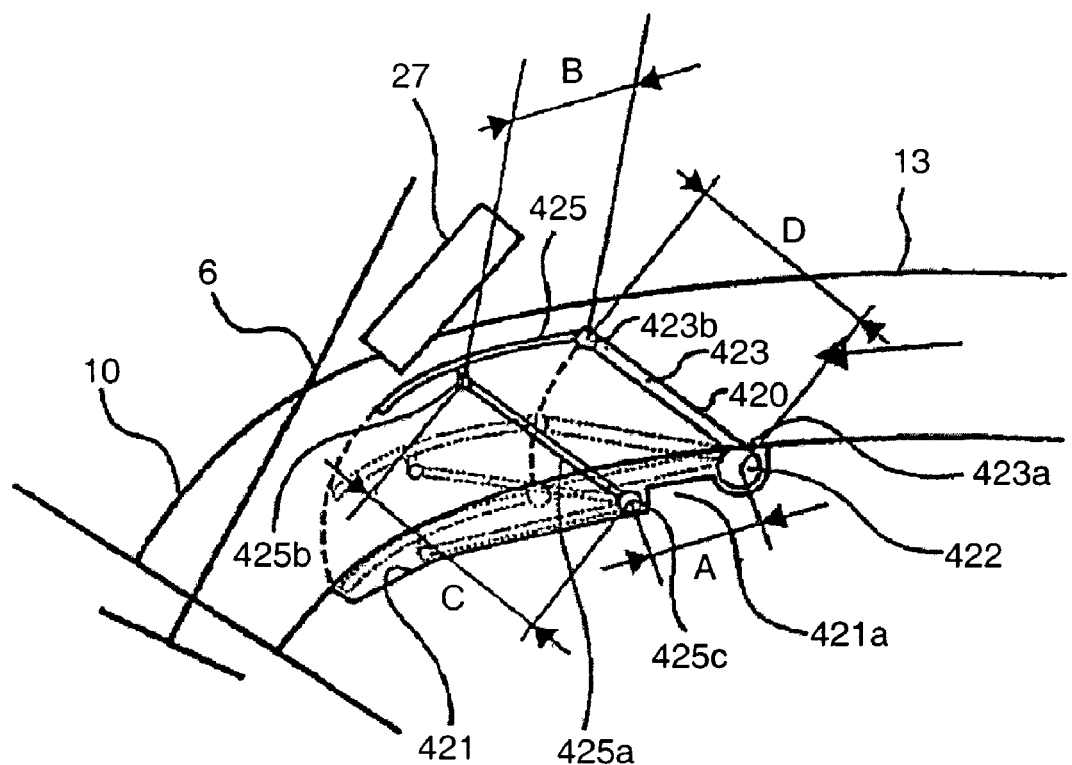
Figure 19:
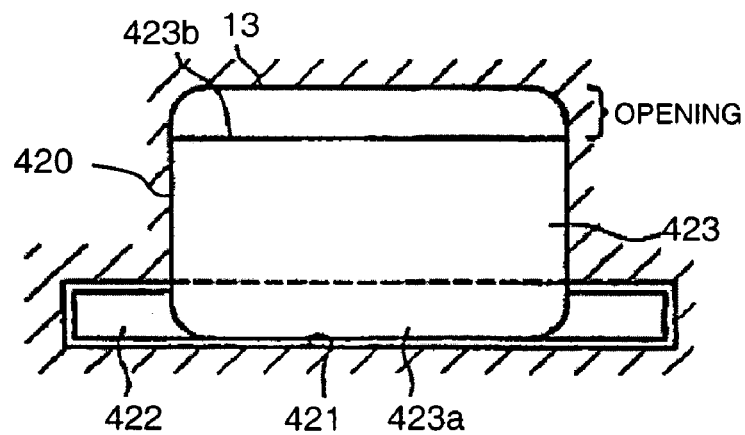
Figure 20:
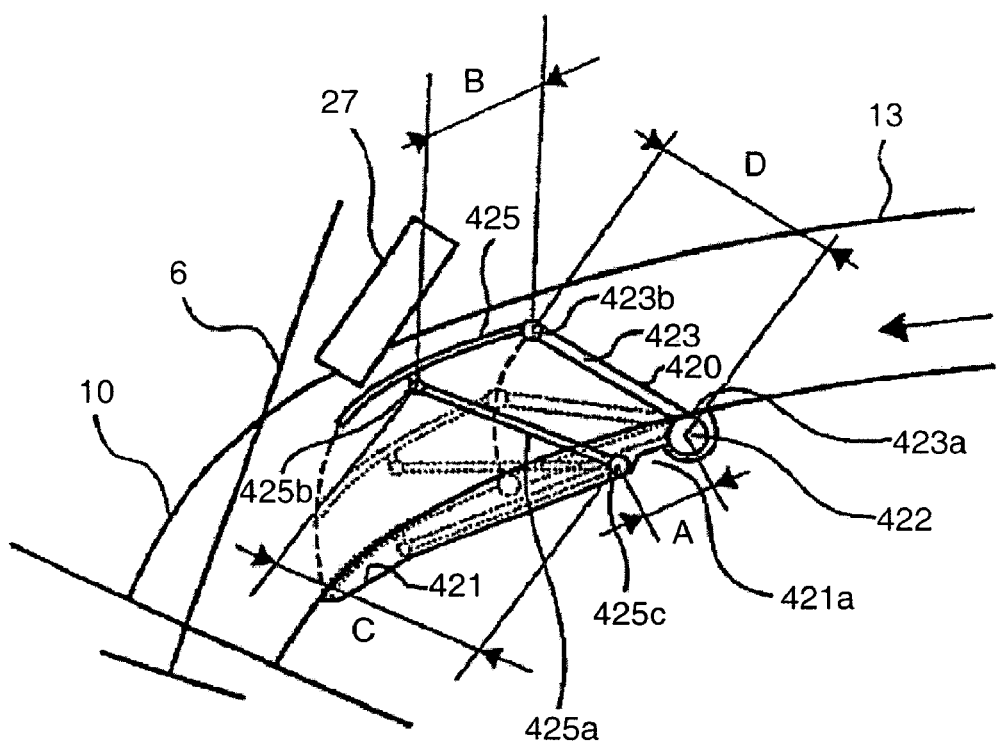
Figure 21:
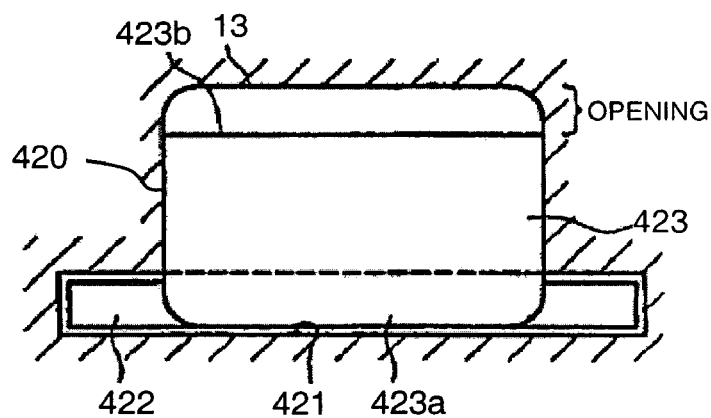
Figure 22:
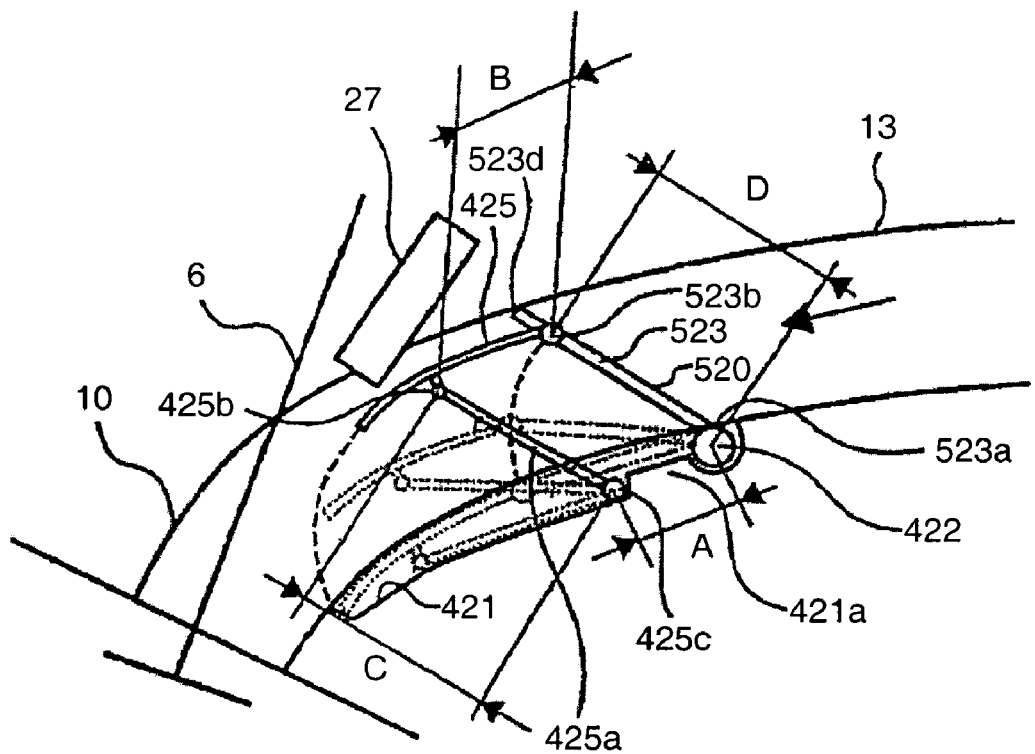
Figure 23:
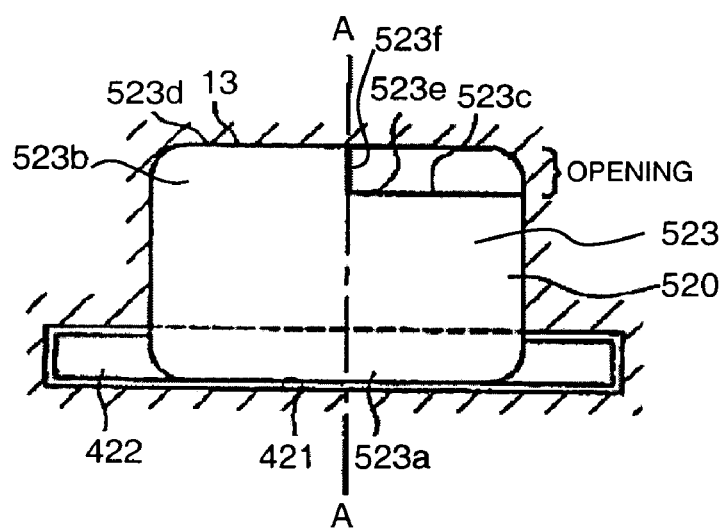
Figure 24:
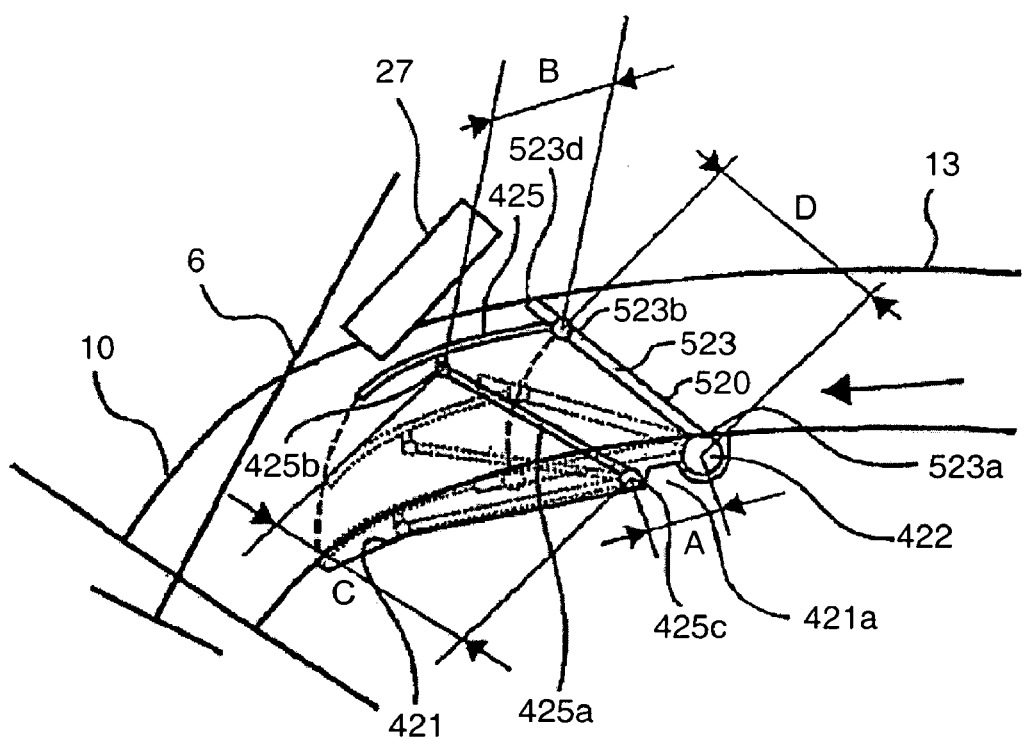
Figure 25:
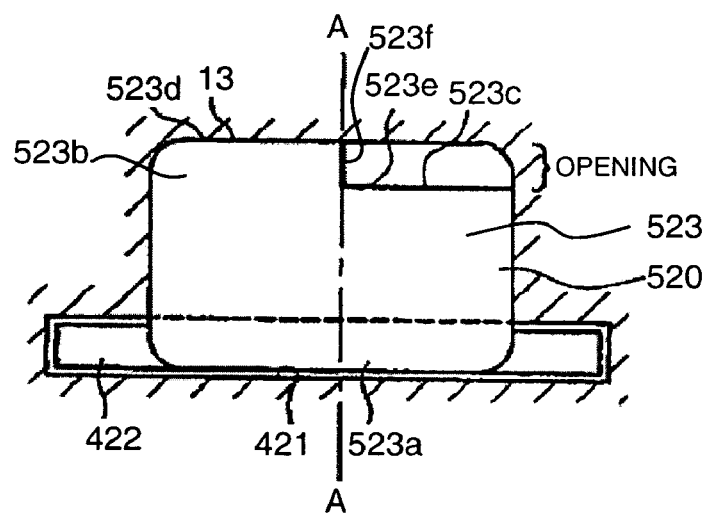
Figure 26:
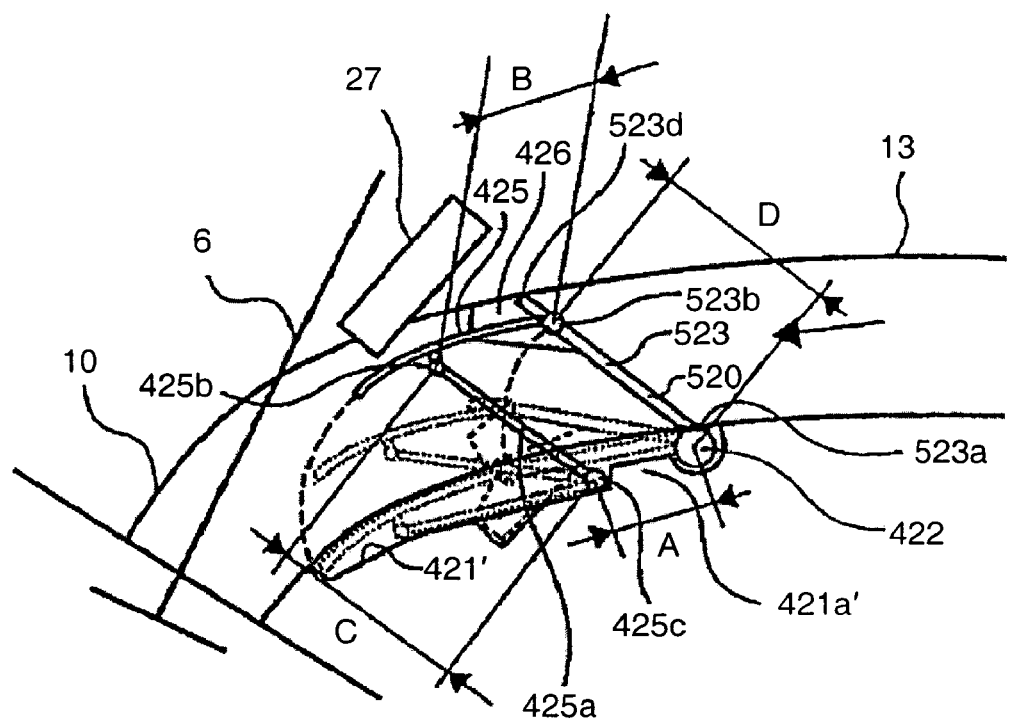
Figure 27:
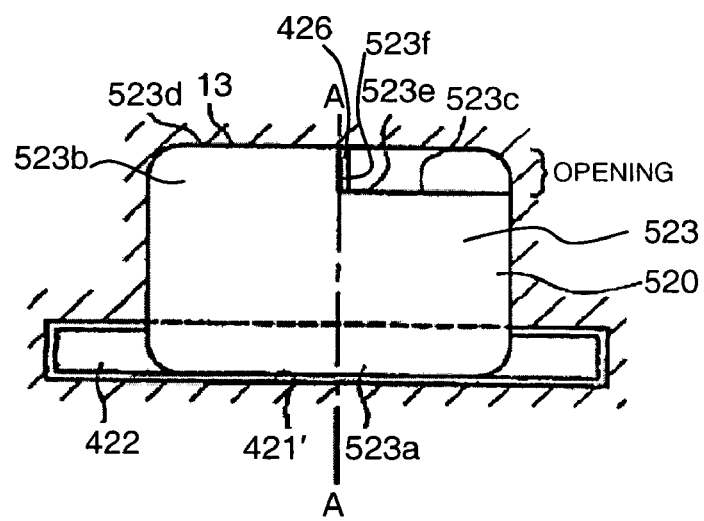
Figure 28:
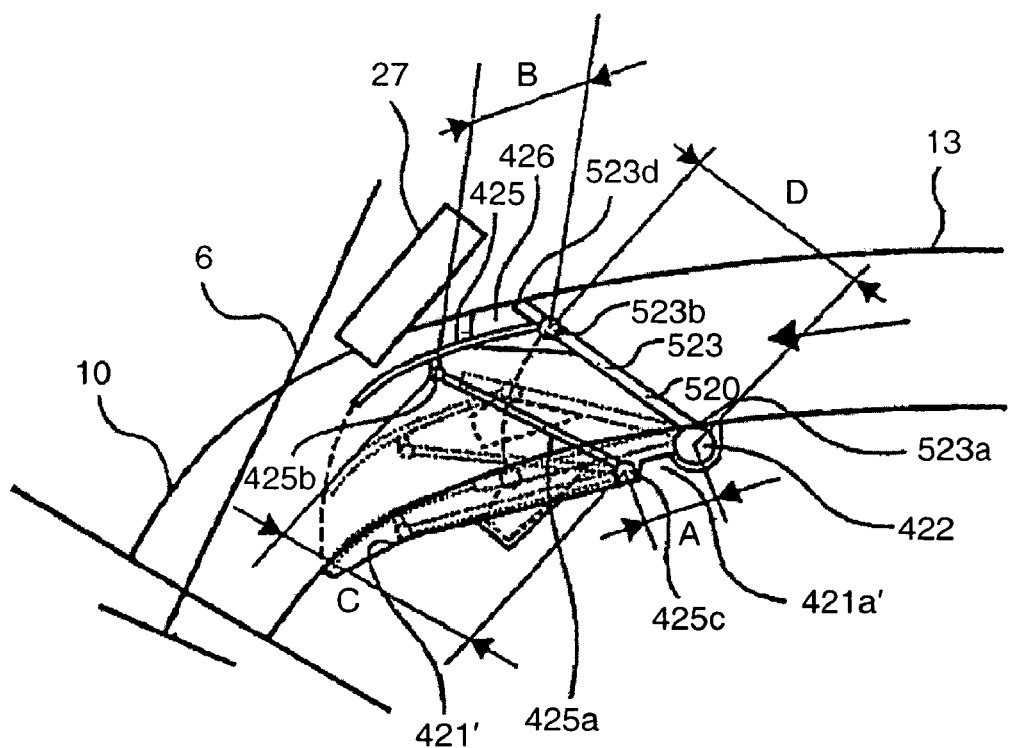
Figure 29:
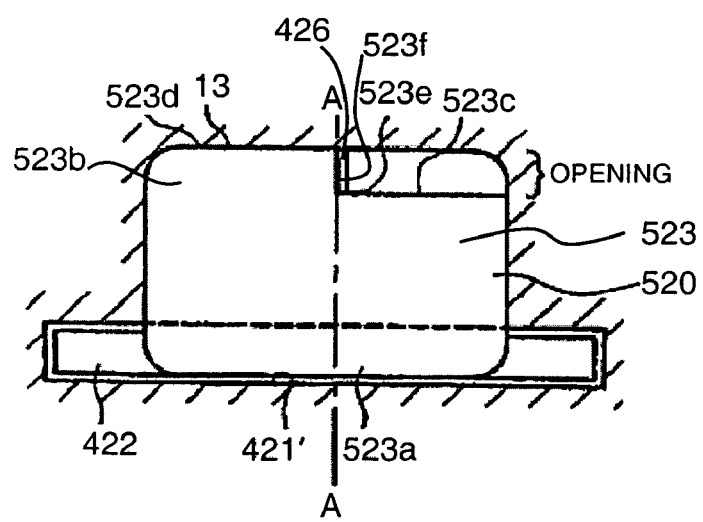
Figure 30:
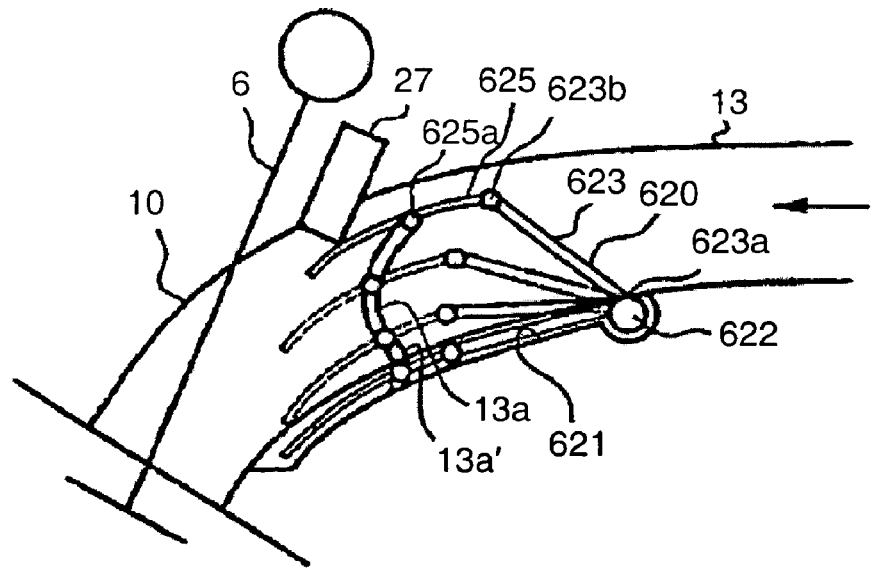
Figure 31:
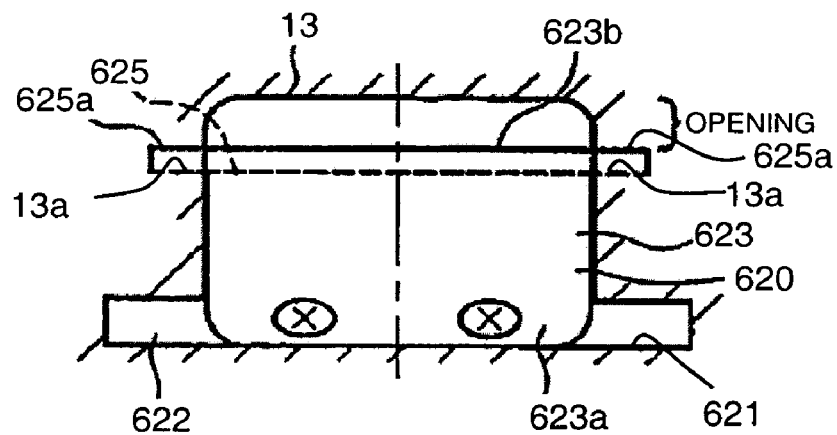
Figure 32:
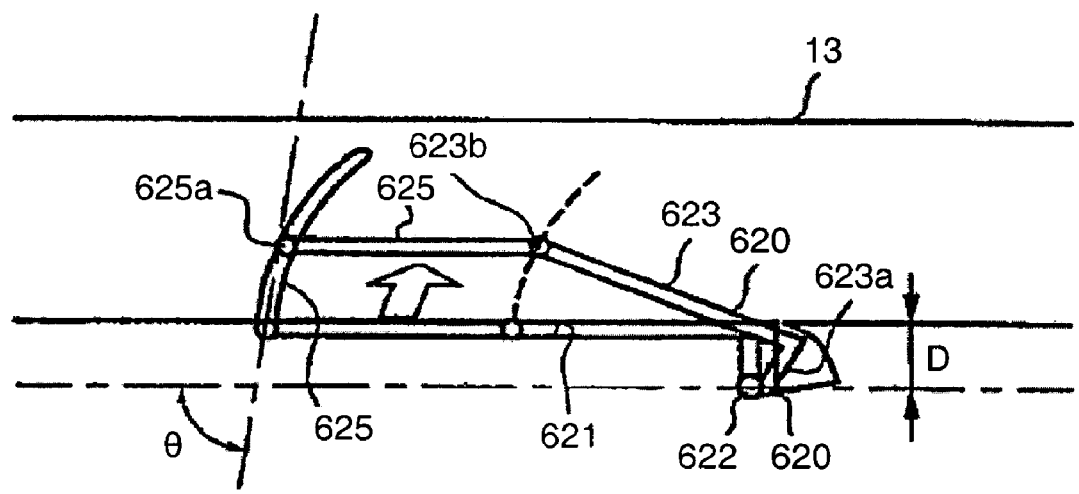
Figure 33:
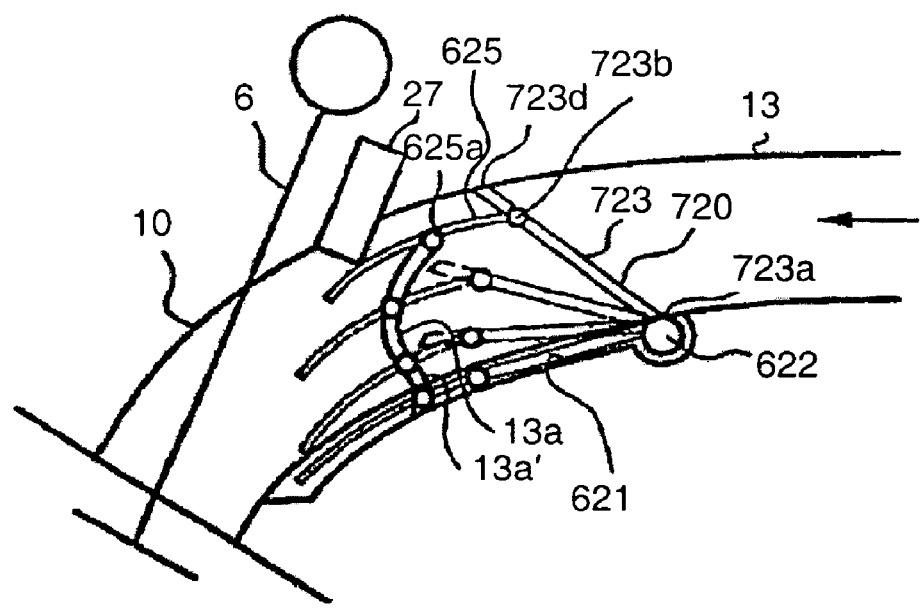
Figure 34:
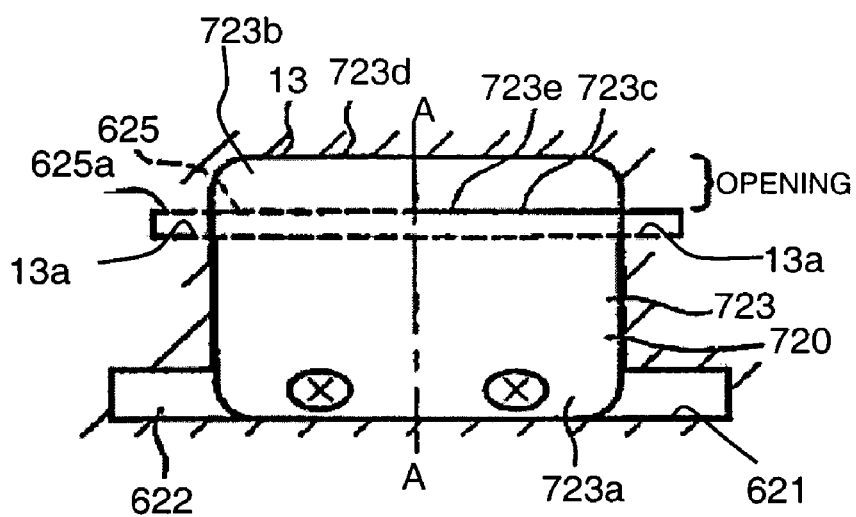

6 to 9 as seen along section line 10-10 of FIG. 9 in accordance with the third embodiment of the present invention;

FIG. 11 is a simplified longitudinal cross sectional view of the portion of the air intake passage illustrated in FIGS. 6 to 10 as seen along section line 11-11 of FIG. 9 in accordance with the third embodiment of the present invention;

FIG. 12 is a simplified longitudinal cross sectional view of a portion of an air intake passage that uses a plurality of horizontal plate-like members and a plurality of vertical plate-like members that are arranged to form a honeycomb-like structure in accordance with a fourth embodiment of the present invention;

FIG. 13 is a simplified transverse cross sectional view of the portion of the air intake passage illustrated in FIG. 12 in accordance with the fourth embodiment of the present invention;

FIG. 14 is a simplified longitudinal cross sectional view of the portion of the air intake passage illustrated in accordance with a fifth embodiment of the present invention;

FIG. 15 is a simplified transverse cross sectional view of the portion of the air intake passage illustrated in FIG. 14 as seen along section line 15-15 of FIG. 14 in accordance with the fifth embodiment of the present invention;

FIG. 16 is a simplified longitudinal cross sectional view of the portion of the air intake passage illustrated in accordance with a sixth embodiment of the present invention;

FIG. 17 is a simplified transverse cross sectional view of the portion of the air intake passage illustrated in FIG. 16 as seen along section line 17-17 of FIG. 16 in accordance with the sixth embodiment of the present invention;

FIG. 18 is a simplified longitudinal cross sectional view of the portion of the air intake passage illustrated in accordance with a seventh embodiment of the present invention;

FIG. 19 is a simplified transverse cross sectional view of the portion of the air intake passage illustrated in FIG. 18 in accordance with the seventh embodiment of the present invention;

FIG. 20 is a simplified longitudinal cross sectional view of the portion of the air intake passage illustrated in accordance with an eighth embodiment of the present invention;

FIG. 21 is a simplified transverse cross sectional view of the portion of the air intake passage illustrated in FIG. 20 in accordance with the eighth embodiment of the present invention;

FIG. 22 is a simplified longitudinal cross sectional view of the portion of the air intake passage illustrated in accordance with a ninth embodiment of the present invention;

FIG. 23 is a simplified transverse cross sectional view of the portion of the air intake passage illustrated in FIG. 22 in accordance with the ninth embodiment of the present invention;

FIG. 24 is a simplified longitudinal cross sectional view of the portion of the air intake passage illustrated in accordance with a tenth embodiment of the present invention;

FIG. 25 is a simplified transverse cross sectional view of the portion of the air intake passage illustrated in FIG. 24 in accordance with the tenth embodiment of the present invention;

FIG. 26 is a simplified longitudinal cross sectional view of the portion of the air intake passage illustrated in accordance with an eleventh embodiment of the present invention;

FIG. 27 is a simplified transverse cross sectional view of the portion of the air intake passage illustrated in FIG. 26 in accordance with the eleventh embodiment of the present invention;

FIG. 28 is a simplified longitudinal cross sectional view of the portion of the air intake passage illustrated in accordance with a twelfth embodiment of the present invention;

FIG. 29 is a simplified transverse cross sectional view of the portion of the air intake passage illustrated in FIG. 28 in accordance with the twelfth embodiment of the present invention;

FIG. 30 is a simplified longitudinal cross sectional view of the portion of the air intake passage illustrated in accordance with a thirteenth embodiment of the present invention;

FIG. 31 is a simplified transverse cross sectional view of the portion of the air intake passage illustrated in FIG. 30 in accordance with the thirteenth embodiment of the present invention;

FIG. 32 is a simplified partial longitudinal cross sectional view of the portion of the air intake passage illustrated in FIGS. 30 and 31 with a slight modification in accordance with the thirteenth embodiment of the present invention;

FIG. 33 is a simplified transverse cross sectional view of the portion of the air intake passage illustrated in accordance with a fourteenth embodiment of the present invention; and FIG. 34 is a simplified transverse cross sectional view of the portion of the air intake passage illustrated in FIG. 33 in accordance with the fourteenth embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
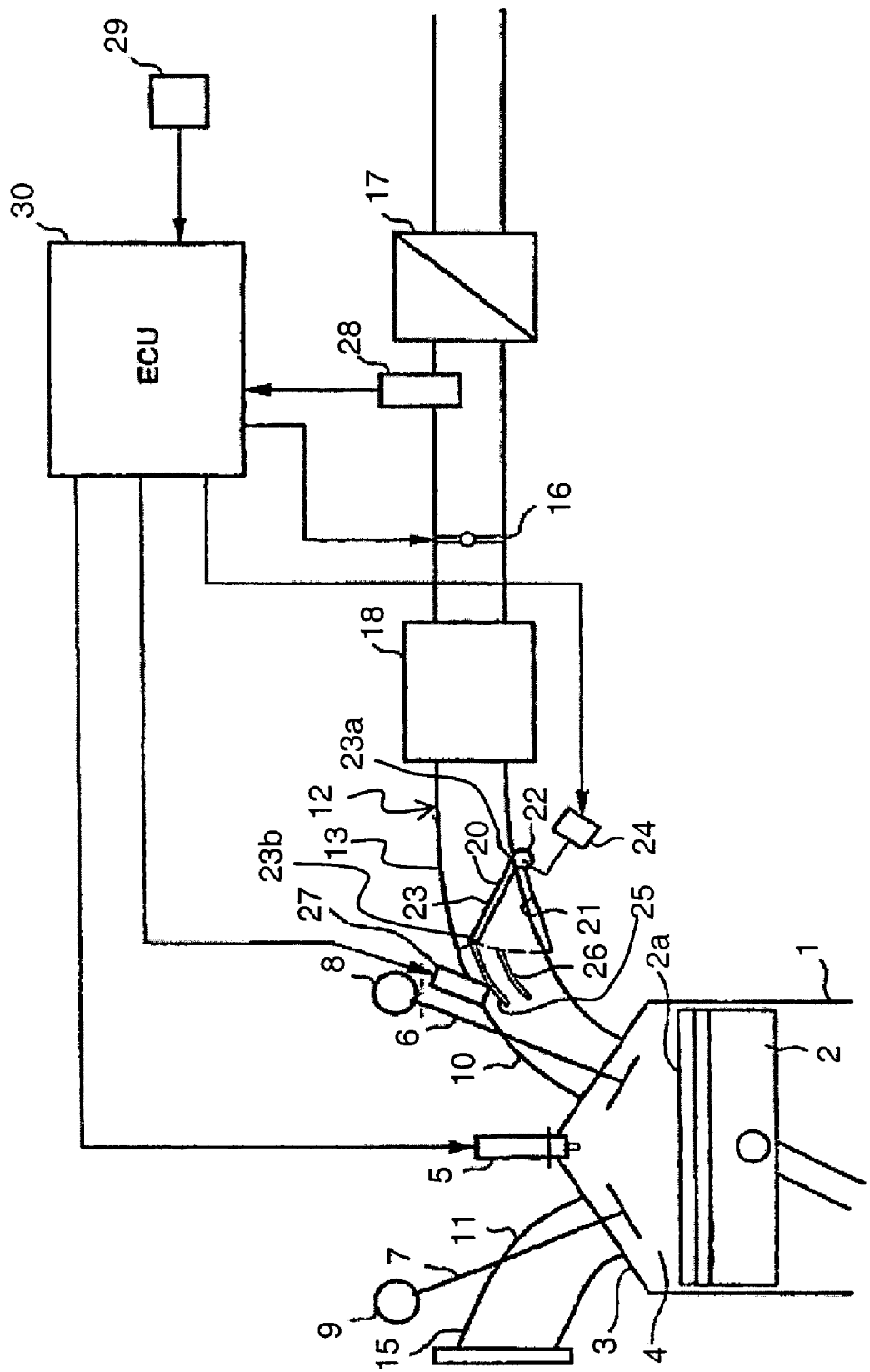
FIG. 1 is a simplified schematic view of a portion of an internal combustion engine with an air intake structure in accordance with a first embodiment of the present invention.
Figure 2:
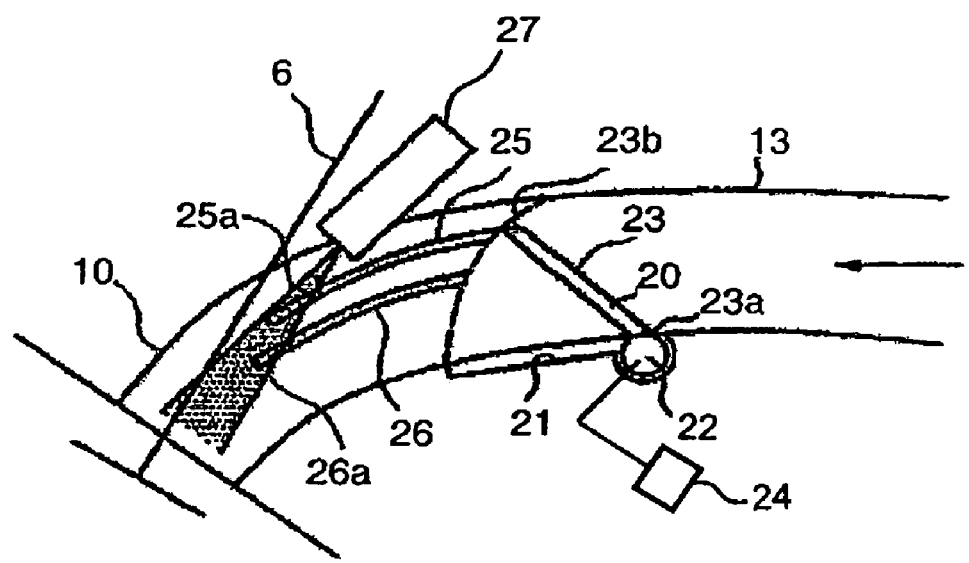
FIG. 2 is an enlarged, simplified longitudinal cross sectional view of a portion of the air intake passage illustrated in FIG. 1 that uses two horizontal plate-like members in accordance with the first embodiment of the present invention.
Figure 3:
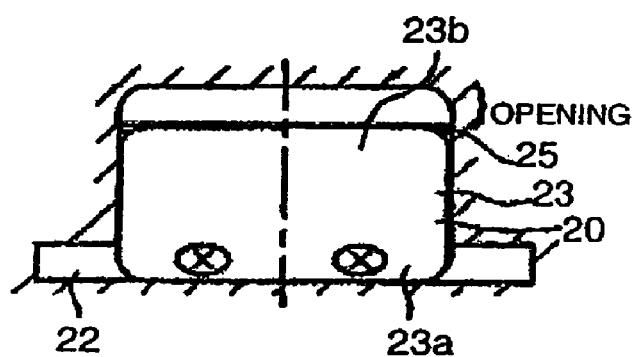
FIG. 3 is a simplified transverse cross sectional view of the portion of the air intake passage illustrated in FIG. 2 in accordance with the first embodiment of the present invention.

Referring initially to FIGS. 1-3, a portion of an internal combustion engine is schematically illustrated that is configured with an air intake structure in accordance with a first embodiment of the present invention. The internal combustion engine basically includes a plurality of (e.g., four) cylinders 1 (only one shown in figure) with a piston 2 arranged inside of each of the cylinders 1 to reciprocate in a conventional manner. The cylinders 1 are formed in an engine block that has a cylinder head 3 mounted to overlie each of the cylinders 1. Thus, a top surface 2a of each of the pistons 2 and a portion of the cylinder head 3 above each of the cylinders 1 form a combustion chamber 4. A spark plug 5 is arranged in the cylinder head 3 above each of the combustion chambers 4.

Two intake valves 6 and two exhaust valves 7 are arranged in each of the combustion chambers 4. The intake valves 6 and the exhaust valves 7 are opened and closed by a pair of valve operating mechanisms 8 and 9, respectively, in a conventional manner.

Dual input ports 10 and dual exhaust ports 11 (only one of each shown in FIG. 1) are arranged on opposite sides of each of the combustion chambers 4. An intake manifold 12 is connected to each of the air intake ports 10 of each of the combustion chambers 4 so as to form a plurality of intake passages 13 (only one shown in FIG. 1) for supplying intake air individually to each of the combustion chambers 4. Also an exhaust manifold (not shown) is connected to the exhaust ports 11 of each of the combustion chambers 4 so as to form a plurality of exhaust passages 15 (only one shown in FIG. 1) for removing exhaust air individually to each of the combustion chambers 4.

A throttle valve 16 is arranged upstream of the intake manifold 12 to regulate the flow of fresh air into the intake passages 13. Fresh air is drawn in through an air cleaner 17 arranged upstream of the throttle valve 16 in accordance with the open/close control of the throttle valve 16.

A collector 18 is arranged downstream of the throttle valve 16 and serves to distribute intake air to each of the cylinders 1 through the intake manifold 12, which is connected to the collector 18.

Each of the intake passages 13 has an air intake control valve 20 disposed therein for deflecting the intake air to one side of the air intake passage 13. The air intake control valve 20 is a tumble control valve in this embodiment. Preferably, a portion of the bottom surface of the internal passage wall is provided with a recess or cavity that forms a storage compartment 21 for storing the air intake control valve 20. As shown in FIG. 2, the air intake control valve 20 is pivotally attached to the passage wall of the air intake passage 13 by a valve shaft 22. In other words, the air intake control valve 20 is a flap valve having the valve shaft 22 arranged in a turnable fashion in a prescribed position of the storage compartment 21. The valve shaft 22 forms a pivot or rotational axis that is disposed in a position closely adjacent to the passage wall in a section of the air intake passage 13 (e.g., in the intake manifold 12). Preferably, the rotational axis of the valve shaft 22 is located on a portion of the bottom surface of the passage wall such that the valve shaft 22 is outside of the air flow path of the air intake passage 13. The air intake control valve 20 preferably has a plate-like valve element 23 that is fixed to the valve shaft 22 at an inner end 23a thereof.

The valve shaft 22 of the air intake control valve 20 can be turned (rotated) by an actuator 24 (servomotor). Thus, the opening and closing of the air intake passage 13 is controlled by operating the actuator 24 and, thereby, controlling the rotational position of the valve shaft 22. When the valve shaft 22 is turned, the outer edge 23b of the valve element 23 moves along a circular arc centered on the valve shaft 22. For example, when the air intake control valve 20 is fully open, i.e., when the valve element 23 of the air intake control valve 20 is positioned so as to be parallel to the air intake passage 13, the entire air intake control valve 20 is housed in the storage compartment 21. In this fully open state, the flow resistance with respect to the intake air is reduced.

The air intake passage 13 (e.g., in the intake port 10) has a pair of horizontal partitioning plates or members 25 and 26 that are arranged inside the air intake passage 13 (e.g., in the intake port 10) as members for regulating the flow of the intake air. The horizontal partitioning plates 25 and 26 are horizontal plate-like members that are arranged so as to be oriented along the flow direction of the intake air in the air intake passage 13 and configured to have rectifying effect with respect to the flow of the intake air. In other words, the horizontal partitioning plates 25 and 26 are arranged longitudinally within the air intake passage 13 so as to extend along the flow direction of the intake air. The first horizontal partitioning plate 25 is arranged parallel to the horizontal partitioning plate 26 and is closer to the upper wall of the air intake passage 13 than the horizontal partitioning plate 26. When the valve shaft 22 of the air intake control valve 20 is at a first prescribed rotational position, i.e., when the air intake control valve 20 is in the fully closed state shown in FIG. 2, the horizontal partitioning plate 25 forms a continuous contour with respect to the outer edge 23b of the valve element 23. In other words, the horizontal partitioning plate 25 is arranged so as to extend along the flow direction of the intake air from a position corresponding to the position where the outer edge 23b of the valve element 23 when the air intake control valve 20 is in the fully closed state shown in FIG. 2. When the air intake control valve 20 is in a second prescribed rotational position (partially closed state), horizontal partitioning plate 26 forms a continuous contour with respect to the outer edge 23b of the valve element 23 Thus, the horizontal partitioning plates 25 and 26 serve as a plurality of thin plate-like members (two in FIGS. 1 and 2) constituting an intake air flow partitioning (rectifying) unit. The first horizontal partitioning plate 25 and the horizontal partitioning plate 26 are each arranged so as to extend along the flow direction of the intake air from a position corresponding to the position the outer edge 23b of the valve element 23 when the air intake control valve 20 (valve shaft 22) is in one of a plurality of rotational positions. The rotational positions of the air intake control valve 20 include of two positions in this embodiment, i.e., a first prescribed rotational position and a second prescribed rotational position.

The first horizontal partitioning plate 25 is configured to form a continuous contour with respect to the outer edge 23b of the valve element 23 when the valve shaft 22 is in the first prescribed rotational position. The second horizontal partitioning plate 26 is configured to form a continuous contour with respect to the outer edge 23b of the valve element 23 when the valve shaft 22 is in the second prescribed rotational position.

A fuel injection valve 27 is provided in a downstream portion of the air intake passage 13 at a position upstream of the branch point where the air intake passage 13 branches into two intake ports 10.

Various sensors are also provided to detect the operating conditions of the engine. For example, as shown in the FIG. 1, an air flow meter 28 (intake air detection sensor) is provided in the air intake passage 13 at a position upstream of the throttle valve 16, and a crank angle sensor 29 is provided to output a signal corresponding to the rotational speed of the engine. The actuator 24 (i.e., the rotational position of the valve shaft 22) is controlled based on engine operating conditions such as engine rotational speed detected by these sensors 28 and 29 and or other sensors.

In particular, the output signals of these sensors 28 and 29 are fed to an engine control unit ("ECU") 30, where they are used in various computations and control operations. The engine control unit 30 preferably includes a microcomputer with a control program that controls the operation of the engine. For example, the engine control unit 30 is configured and programmed to control the spark ignition timing of the spark plugs 5, the opening degree of the throttle valve 16, the actuator 24 (i.e., the rotational position of the valve shaft 22), and the fuel injection from the fuel injection valve 27. The engine control unit 30 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the engine control unit 30 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

FIGS. 2 and 3 show the relationship between the air intake control valve 20 and the intake air flow partitioning unit (the first and second horizontal partitioning plates 25 and 26). FIG. 2 is a cross sectional view of the air intake passage 13, while FIG. 3 is a view from the direction of the arrow shown in FIG. 2.

As shown in FIG. 2, when the outer edge 23b of the valve element 23 of the air intake control valve 20 is aligned so as to form a continuous contour with respect to the upstream end of the first horizontal partitioning plate 25, the intake air flows through an opening formed between the first horizontal partitioning plate 25 and the upper wall surface of the air intake passage 13. When the air intake control valve 20 is in this position, the portion of the air intake passage 13 located below the first horizontal partitioning plate 25 is blocked by the air intake control valve 20 as shown in FIG. 3. Thus, the intake air that flows through an opening formed between the first horizontal partitioning plate 25 and the upper wall surface of the air intake passage 13 forms a tumble flow (vertical swirl flow). As a result, a stronger tumble flow can be achieved than with a conventional air intake structure even when the intake air quantity is small, particularly when the load of the engine is low.

The determination as to whether to align the outer edge 23b of the valve element 23 with the upper end of either the first horizontal partitioning plate 25 or the horizontal partitioning plate 26 is based on the operating conditions of the engine. For example, in low rotational speed/low load regions and when the engine is cold, the air intake control valve 20 (valve shaft 22) is turned such that the outer edge 23b of the valve element 23 is aligned with the upper end of the first horizontal partitioning plate 25. As a result, the tumble flow is strengthened and the stability of the operation of the engine is improved.

When the engine is operating in a medium rotational speed/medium load region, the air intake control valve 20 is turned such that the outer edge 23b of the valve element 23 is aligned with the upper end of the horizontal partitioning plate 26. As a result, an appropriate intake air quantity is ensured while also ensuring an appropriate gas flow.

When the engine is operating in a high rotational speed/high load region, the valve shaft 22 is rotated such that the air intake control valve 20 is opened fully and the valve element 23 is stored in the storage compartment 21. As a result, the resistance to flow of the intake air imposed by the air intake control valve 20 is eliminated.

The downstream sides of the first horizontal partitioning plate 25 and the horizontal partitioning plate 26 extend to the vicinity of the fuel injection valve 27. A notch 25a and 26a is provided in the downstream side of each of the horizontal partitioning plates 25 and 26. The shapes of the notches 25a and 26b provided in the downstream sides of the first horizontal partitioning plate 25 and the horizontal partitioning plate 26 correspond to the shape of the fuel stream injected from the fuel injection valve 27.

The notches 25a and 26a provided in the first horizontal partitioning plate 25 and the horizontal partitioning plate 26a prevent the intake air passageway from being constricted in the portion of the air intake passage 13 where the fuel injection valve 27 protrudes into the air intake passage 13, thereby allowing the intake air to be introduced into the cylinder in a smooth fashion and preventing fuel mist from sticking to the first horizontal partitioning plate 25 and the horizontal partitioning plate 26 (i.e., preventing wall flow).

Although FIGS. 1 and 2 illustrate a case in which the intake air flow partitioning unit comprises two plate-like members, i.e., a first horizontal partitioning plate 25 and a horizontal partitioning plate 26, the invention is not limited to two plate-like members.

Second Embodiment

Figure 4:
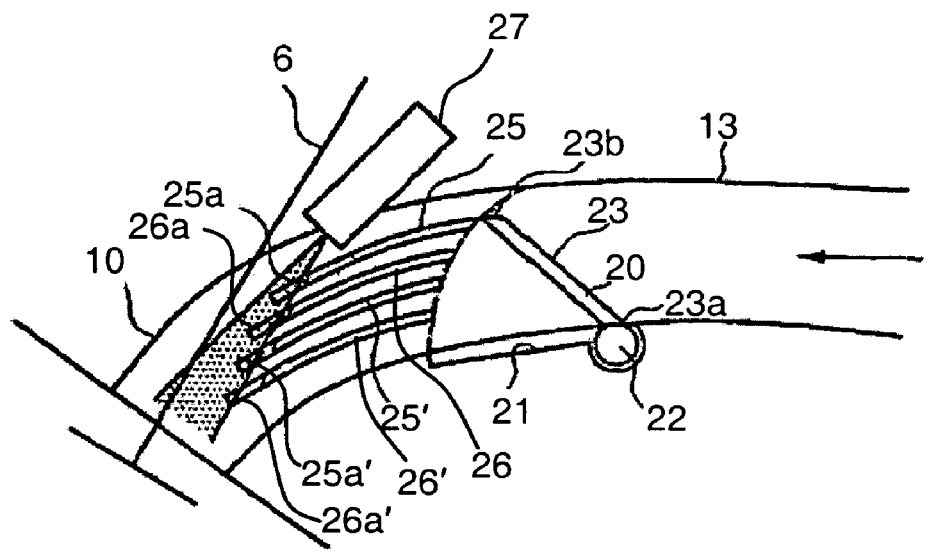
FIG. 4 is an enlarged, simplified longitudinal cross sectional view of a portion of an air intake passage that uses multiple (four) horizontal plate-like members in accordance with a second embodiment of the present invention.
Figure 5:
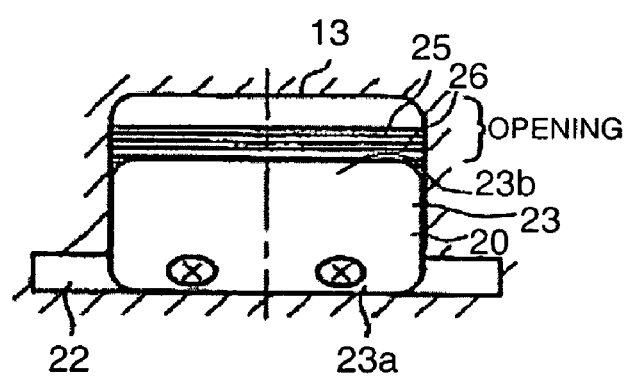
FIG. 5 is a simplified transverse cross sectional view of the portion of the air intake passage illustrated in FIG. 4 in accordance with the second embodiment of the present invention.

Referring now to FIGS. 4 and 5, an air intake structure is illustrated in accordance with a second embodiment. This air intake structure of the second embodiment replaces the air intake structure of the first embodiment that is shown in FIG. 1. In other words, the air intake structure of the second embodiment is installed in the internal combustion engine of FIG. 1. Basically, the air intake structure of the second embodiment is identical to the air intake structure of the first embodiment, except that additional horizontal partitioning plates. In view of the similarity between this embodiment and the prior embodiments; the parts of the second embodiment that are identical to the parts of the first embodiment will be given the same reference numerals as the parts of the prior embodiments. Moreover, the descriptions of the parts of the second embodiment that are identical to the parts of the first embodiments may be omitted for the sake of brevity.

As shown in FIGS. 4 and 5, it is also acceptable for the intake air flow partitioning unit to comprise multiple plate-like members (e.g., four plate-like members). In particular, the air intake passage 13 has four horizontal partitioning plates, i.e., the horizontal partitioning plates 25 and 26 and two supplemental horizontal partitioning plates 25' and 26' that are identical to the horizontal partitioning plates 25 and 26 except for the vertical locations within the air intake passage 13. In such a case, the air intake structure should be configured to adjust the outer edge 23b of the valve element 23 of the air intake control valve 20 to an appropriate position in accordance with the operating conditions of the engine.

Thus, each plate-like member of the intake air flow partitioning unit is arranged in a position corresponding to one of the plurality of opening positions (rotational positions) of the air intake control valve 20. As a result, a stable gas flow can be achieved at each of the rotational positions of the air intake control valve 20, enabling exhaust emissions to be greatly reduced and the fuel economy to be improved.

Additionally, in this embodiment, the downstream side of the intake air flow partitioning unit (i.e., the downstream sides of the horizontal partitioning plates 25, 26, 25' and 26') extends to the vicinity of the fuel injection valve 27 arranged in the air intake passage 13. The horizontal partitioning plates 25, 26, 25' and 26' are provided with notches 25a, 26a, 25a' and 26a', respectively. As a result, the intake air passageway is prevented from being constricted in the portion of the air intake passage 13 where the fuel injection valve 27 protrudes into the air intake passage 13, thereby allowing the intake air to be introduced into the cylinder in a smooth fashion.

In this embodiment, the shapes of the notches 25a, 26a, 25a' and 26a' provided in the downstream side of the intake air flow partitioning unit (i.e., in the downstream sides of the horizontal partitioning plates 25, 26, 25' and 26') correspond to the shape of the fuel stream injected from the fuel injection valve 27. As a result, fuel mist is prevented from sticking to the intake air flow rectifying members (i.e., the horizontal partitioning plates 25, 26, 25' and 26').

In this embodiment as in the first embodiment, a portion of the wall of the air intake passage 13 is configured with a recess that forms a storage compartment 21 for storing the air intake control valve 20. As a result, the flow resistance with respect to the intake air can be reduced when the valve shaft 22 is turned such that the air intake control valve 20 is fully opened because the valve element 23 is stored in the storage compartment 21.

Third Embodiment

Referring now to FIGS. 6 to 11, an air intake structure is illustrated in accordance with a third embodiment. This air intake structure of the third embodiment replaces the air intake structure of the first embodiment that is shown in FIG. 1. In other words, the air intake structure of the third embodiment is installed in the internal combustion engine of FIG. 1. Basically, the air intake structure of the third embodiment is identical to the air intake structure of the first embodiment, except that an air intake control valve 120 is used instead of the air intake control valve 20. In view of the similarity between this embodiment and the prior embodiments, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity.

As shown in FIGS. 6 to 11, the air intake control valve 120 of the third embodiment is a swirl control valve. Thus, the air intake control valve 120 is pivotally attached to the passage wall of the air intake passage 13 by a valve shaft 22. In other words, the air intake control valve 120 is a flap valve having the valve shaft 22 arranged in a turnable fashion in a prescribed position of the storage compartment 121. The valve shaft 22 forms a pivot axis that is disposed in a position closely adjacent to the passage wall in a section of the air intake passage 13 (e.g., in the intake manifold 12). Preferably, the pivot axis of the valve shaft 22 is located on a portion of the bottom surface of the passage wall such that the valve shaft 22 is outside of the air flow path of the air intake passage 13. The air intake control valve 120 preferably has a plate-like valve element 123 that is fixed to the valve shaft 22 at an inner end 123*a* thereof. The valve element 123 has an outer end 123*b* with a swirl-producing notch 123*c* formed on the right side of the outer end 123*b* of the valve element 123. The valve element 123 has a first free outer edge 123*d* that is the outer edge of the side of the outer end 123*b* where the swirl-producing notch 123*c* is not formed and a second free outer edge 123*e* that is the outer edge 123*e* of the side of the outer end 123*b* where the swirl-producing notch 123*c* is formed.

The first horizontal partitioning plate 125 has a downstream notch 125*a* and an upstream notch 125*b*. The second horizontal partitioning plate 126 has a downstream notch 126*a* and an upstream notch 126*b*. The downstream sides of the first horizontal partitioning plate 125 and the horizontal partitioning plate 126 extend to the vicinity of the fuel injection valve 27. Thus, the downstream notches 125*a* and 126*a* are configured and arranged in the downstream sides of the horizontal partitioning plates 125 and 126 so as to avoid interference with the fuel stream of the fuel injection valve 27. In other words, the shapes of the notches 125*a* and 126*b* provided in the downstream sides of the horizontal partitioning plates 125 and 126 correspond to the shape of the fuel stream injected from the fuel injection valve 27. The downstream notches 125*a* and 126*a* are configured and arranged in to prevent the intake air passageway from being constricted in the portion of the air intake passage 13 where the fuel injection valve 27 protrudes into the air intake passage 13, thereby allowing the intake air to be introduced into the cylinder in a smooth fashion and preventing fuel mist from sticking to the first horizontal partitioning plate 125 and the horizontal partitioning plate 126 (i.e., preventing wall flow).

The upstream notches 125*b* and 126*b* are configured and arranged in the upstream sides of the horizontal partitioning plates 125 and 126 so on the leftward extending side portions such that first and second horizontal partitioning plates 125 and 126 will not interfere with the outer edge 123*d* of the side of the outer end 123*b* of the valve element 123 where the swirl-producing notch 123*c* is not formed. In other word the upstream ends of the first and second horizontal partitioning plates 125 and 126 are stepped shape to correspond to the stepped shape of the outer end 123*b* of the valve element 123. Each of the notches forms a continuous contour with respect to the free outermost edge 123*d* of the valve element 123 when the valve shaft 22 is at a prescribed rotational position.

Figure 6:
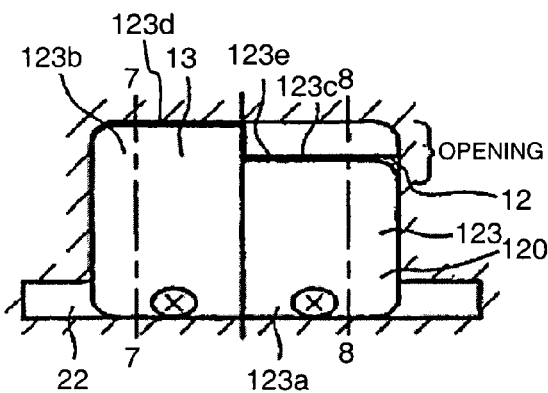
FIG. 6 is an enlarged, simplified transverse cross sectional view of a portion of an air intake passage that uses multiple (two) horizontal plate-like members in accordance with a third embodiment of the present invention.
Figure 7:
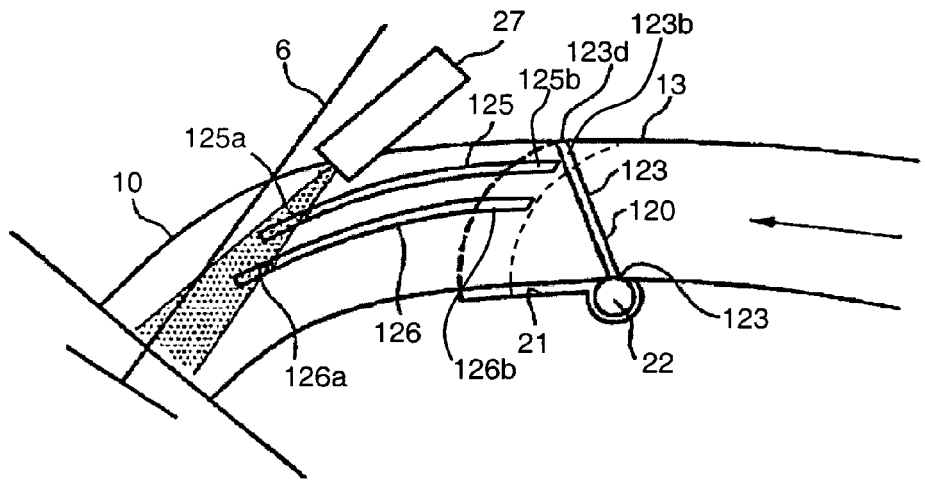
FIG. 7 is a simplified longitudinal cross sectional view of the portion of the air intake passage as seen along section line 7-7 of FIG. 6 in accordance with the third embodiment of the present invention.
Figure 8:
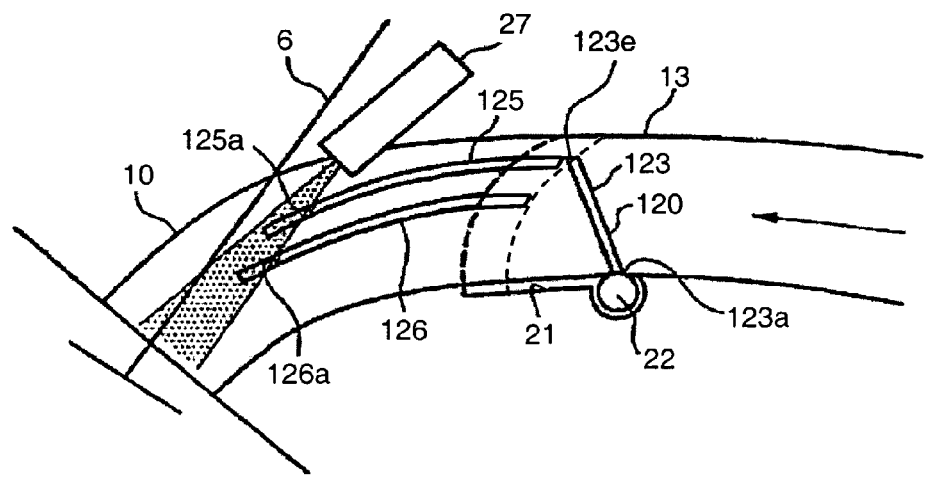
FIG. 8 is a simplified longitudinal cross sectional view of the portion of the air intake passage illustrated in FIGS. 6 and 7 as seen along section line 8-8 of FIG. 6 in accordance with the third embodiment of the present invention.

FIG. 6 shows the air intake control valve 120 as viewed from an upstream position of the air intake passage 13 when the air intake control valve 120 is fully closed. FIG. 7 is a cross sectional view of the air intake passage 13 taken along section line 7-7 of FIG. 6, while FIG. 8 is a cross sectional view of the air intake passage 13 taken along section line 8-8 of FIG. 6.

FIG. 9 shows the air intake control valve 120 when the valve shaft 22 is in a prescribed rotational position such that the air intake control valve 120 is closed to a prescribed degree. FIG. 10 is a cross sectional view of the air intake passage 13 taken along section line 10-10 of FIG. 9, while FIG. 11 is a cross sectional view of the air intake passage 13 taken along section line 11-11 of FIG. 9.

When the air intake control valve 120 is fully closed, the first outer edge 123*d* touches against the upper wall surface of the air intake passage 13 and the second outer edge 123*e* is aligned with the first horizontal partitioning plate 125 so as to form a continuous contour therewith as shown in FIG. 6.

When the air intake control valve 120 is in the prescribed rotational position, the first outer edge 123*d* is aligned with the first horizontal partitioning plate 125 and the second outer edge 123*e* is aligned with the second horizontal partitioning plate 126 as shown in FIG. 9.

Although in this embodiment the intake air flow partitioning unit comprises a pair of partitioning plates (i.e., the horizontal partitioning plates 125 and 126), the invention is not limited to two plate-like members. It is also acceptable for the intake air flow partitioning unit to comprise multiple plate-like members arranged such that the first outer edge 123*d* and the second outer edge 123*e* are aligned with two of the plate-like members when the air intake control valve 120 is at any of several prescribed rotational positions that are different than the position shown in FIG. 9. With such an arrangement, the gas flow can be stabilized in an appropriate manner when the air intake control valve 120 is set to any of several intermediate opening degrees.

In this embodiment, the air intake control valve 120 is a swirl control valve in which the swirl-producing notch 123*c* is formed on one side (the right side) of the outer end 123*b* of the valve element 123 along the widthwise direction thereof and includes two horizontal partitioning plates (horizontal partitioning plates 125 and 126). Thus, the first horizontal partitioning plate 125 is arranged and configured to form a continuous contour with respect to the first outer edge 123*e* of the air intake control valve 120 when the air intake control valve is in a first prescribed rotational position (FIGS. 6-8), while the horizontal partitioning plate 126 is arranged and configured to form a continuous contour with respect to the second outer edge 123e of the air intake control valve 120 when the air intake control valve 120 is in the second prescribed rotational position (FIGS. 9-11). As a result, a strong swirl flow (gas flow motion) can be produced when the air intake control valve 120 is at certain prescribed opening positions.

In this embodiment, the second outer edge 123e of the air intake control valve 120 is aligned with the first horizontal partitioning plate 125 when the air intake control valve 120 is fully closed. As a result, a strong swirl flow can be produced when the air intake control valve 120 is fully closed.

Fourth Embodiment

Referring now to FIGS. 12 and 13, an air intake structure is illustrated in accordance with a fourth embodiment. This air intake structure of the fourth embodiment replaces the air intake structure of the first embodiment that is shown in FIG. 1. In other words, the air intake structure of the fourth embodiment is installed in the internal combustion engine of FIG. 1. In view of the similarity between this embodiment and the prior embodiments, the parts of the fourth embodiment that are identical to the parts of the prior embodiments will be given the same reference numerals as the parts of the prior embodiments. Moreover, the descriptions of the parts of the fourth embodiment that are identical to the parts of the prior embodiments may be omitted for the sake of brevity.

In this embodiment, the intake air flow partitioning unit is a honeycomb member 31 having a honeycomb-like structure. More specifically, multiple horizontal plate-like members and multiple vertical plate-like members are arranged so as to form a honeycomb-like structure that can ensure a considerable rectifying effect with respect to the intake air.

The air intake control valve 20 is a flap valve having the same constituent features as the flap valve described in the first embodiment and is configured such that the outer edge 23b of the valve element 23 can align with the honeycomb member 31 in such a manner as to form a continuous contour therewith.

Thus, as the air intake control valve 20 closes the air intake passage 13, the upstream side of the honeycomb member 31 maintains a continuous contour with respect to the outer edge 23b of the valve element 23 of the air intake control valve 20.

In the fourth embodiment, the intake air flow partitioning unit is a honeycomb-like structure (honeycomb member 31). As a result, the intake air can be rectified to a considerable degree. Thus, by adjusting the position of the outer edge 23b of the valve element 23 appropriately in accordance with the operating conditions, a stable gas flow can be produced, enabling exhaust emissions to be greatly reduced and the fuel economy to be improved.

Fifth Embodiment

Referring now to FIGS. 14 and 15, an air intake structure is illustrated in accordance with a fifth embodiment. This air intake structure of the fifth embodiment replaces the air intake structure of the first embodiment that is shown in FIG. 1. In other words, the air intake structure of the fifth embodiment is installed in the internal combustion engine of FIG. 1. In view of the similarity between this embodiment and the prior embodiments, the parts of the fifth embodiment that are identical to the parts of the prior embodiments will be given the same reference numerals as the parts of the prior embodiments. Moreover, the descriptions of the parts of the fifth embodiment that are identical to the parts of the prior embodiments may be omitted for the sake of brevity.

As shown in FIGS. 14 and 15, the air intake control valve 220 (which is a tumble control valve in this embodiment) is moveably mounted to the air intake passage 13 for movement between a storage or retracted (open) position within a storage compartment 221 of the air intake passage 13 and one of a plurality of air deflecting (closed or partially closed) positions, similar to the first embodiment. In particular, the air intake control valve 220 includes a valve shaft 222 that supports a valve element 223. Thus, the air intake control valve 220 is a flap valve in which the valve shaft 222 is arranged in a turnable fashion from a prescribed position within the storage compartment 221 to an extended position that deflects the intake air to one side of the air intake passage 13. The valve element 223 is a rectangular plate-like element that is fixed to the valve element 223 at an inner end 223a thereof such it can turn about the axis of the valve shaft 222. The outer end 223b of the valve element 223 is configured to be parallel to the upper wall of the air intake passage 13 and serves to control the gas flow in accordance with the rotational position of the valve element 223.

However, in this embodiment, a horizontal partitioning plate 225 is mounted to the outer end 223b of the valve element 223 such that the valve element 223 and the horizontal partitioning plate 225 move together between the storage or retracted (open) position within the storage compartment 221 of the air intake passage 13 and the air deflecting or closed position. The horizontal partitioning plate 225 is a horizontal plate-like member that is arranged so as to be oriented along the flow direction of the intake air in the air intake passage 13 and configured to have rectifying effect with respect to the flow of the intake air. Thus, the horizontal partitioning plate 225 is coupled at its upstream end to the outer end 223b of the valve element 223 of the air intake control valve 220 in a freely pivoting manner. In other words, the outer end 223b of the valve element 223 of the air intake control valve 220 is configured for coupling the horizontal partitioning plate 225 thereto.

A link member 225a configured to function as a linking mechanism is arranged in such a manner as to maintain the horizontal partitioning plate 225 generally parallel to the upper wall of the air intake passage 13 (intake port 10). In other words, the horizontal partitioning plate 225 and the link member 225a are arranged such that the horizontal partitioning plate 225 is maintained generally parallel to the flow direction of the intake air (i.e., parallel to the upper wall of the air intake passage 13). The horizontal partitioning plate 225 is connected to a partitioning plate moving device configured to move the horizontal partitioning plate 225 in a direction crosswise (perpendicular) to the flow direction of the intake air in such a manner that the partitioning horizontal partitioning plate 225 remains parallel to the flow direction.

The partitioning plate moving device comprises the link member 225a that is fixed to the horizontal partitioning plate 225 and an actuator 224, which is configured and arranged to move the link member 225a in a variable manner along the direction of the longitudinal axis of the link member 225a. The link member 225a is arranged so as to pass through the bottom wall of the air intake passage 13 with an outer end 225b fixed to the bottom surface of the horizontal partitioning plate 225. The inner end 225c of the link member 225a is connected to the actuator 224, e.g., a servo motor.

The outer end 223b of the valve element 223 (i.e., tumble valve in this embodiment) is coupled in a freely pivoting manner to the upstream end of the horizontal partitioning plate 225. In other words, the upstream end of the horizontal partitioning plate 225 is configured as a coupling part for coupling the end 223a of the valve element 223 thereto, i.e., coupling the horizontal partitioning plate 225 and the valve element 223 together.

As shown in FIG. 15, the valve shaft 222 protrude in a widthwise direction from both sides of the inner end 223a of the valve element 223. With this arrangement, the link member 225a can move the horizontal partitioning plate 225 such that the horizontal partitioning plate 225 remains parallel to the flow direction of the intake air while the valve element 223 blocks the bottom section of the two sections into which the horizontal partitioning plate 225 divides the air intake passage 13.

As shown in FIG. 14, a portion of the bottom wall of the air intake control passage 13 is configured to include a recess that forms the storage compartment 221 configured to store the horizontal partitioning plate 225 and the valve element 223. As shown in FIG. 15, the storage compartment 221 has a pair of lateral guide grooves 221a with a depth corresponding to the projecting end portions of the valve shaft 222 so that the inner end 223a of the valve element 223 can slide along the storage compartment 221. In other words, the guide grooves 221a of the storage compartment 221 have a prescribed length oriented in the flow direction of the intake air (longitudinal direction of the air intake passage 13) as shown in FIG. 14. Thus, the guide grooves 221a of the storage compartment 221 serve to allow the valve shaft 222 to move (slide) in the flow direction of the intake air.

When the link member 225a moves in the axial direction, the horizontal partitioning plate 225, which is fixed integrally to the link member 225a, moves in a direction crosswise (perpendicular) to the flow direction of the intake air while remaining parallel to the flow direction of the intake air (the upper wall of the intake air passage 13). Since the upstream end of the horizontal partitioning plate 225 is coupled to the outer end 223b of the valve element 223, the projecting end portions of the valve shaft 222 move along the guide grooves 221a formed in the storage compartment 221 in the flow direction of the intake air. As a result, the valve element 223 is opened and closed, and the gas flow is controlled, in accordance with the axial position of the link member 225a (i.e., the position of the horizontal partitioning plate 225).

For example, as shown in FIG. 15, when the valve element 223 is partially open, the intake air enters an opening formed between the upper wall of the air intake passage 13 and the outer end 223b of the valve element 223 and the flow of the intake air is rectified by the horizontal partitioning plate 225 and the upper wall of the air intake passage 13 before being introduced into the cylinder 1. As a result, a strong tumble flow is produced.

Meanwhile, when the valve element 223 is fully open, i.e., when the valve element 223 is parallel to the upper wall of the air intake passage 13, the horizontal partitioning plate 225 and the valve element 223 are stored in the storage compartment 221. As a result, the flow resistance with respect to the intake air is reduced.

As in the prior embodiments, the fuel injection valve 27 is arranged inside the air intake passage 13 (intake port 10) downstream of the valve element 223 so that the fuel stream does not interfere with the horizontal partitioning plate 225.

The relationship between the opening and closing of the valve element 223 resulting from the vertical positioning of the horizontal partitioning plate 225 and the operating conditions (load) of the engine in this embodiment will now be explained.

When the internal combustion engine is operating in a low rotational speed/low load region or a medium rotational speed/medium load region, the link member 225a is extended in the axial direction thereof such that the horizontal partitioning plate 225 is moved closer to the upper wall of the air intake passage 13 and the valve element 223 is opened only partially. The vertical position of the horizontal partitioning plate 225 under such conditions is determined based on the rotational speed and the load of the engine. Meanwhile, the opening degree of the valve element 223 is determined by the position of the horizontal partitioning plate 225, and thus, is also determined in accordance with the operating conditions of the engine. As a result, a stable gas flow can be ensured, enabling appropriate exhaust, fuel consumption, and output to be obtained simultaneously. In particular, the tumble flow can be strengthened in regions of low rotational speed and low load.

When the internal combustion engine is operating in a high rotational speed/high load region, the link member 225a is retracted in the axial direction thereof such that the horizontal partitioning plate 225 is stored in the storage compartment 221 and the valve element 223 is fully opened. Since the horizontal partitioning plate 225 and the valve element 223 are stored inside the storage compartment 221 formed in the bottom wall of the air intake passage 13, the flow resistance with respect to the intake air is reduced.

It is also acceptable to determine the vertical position of the horizontal partitioning plate 225, i.e., the opening degree of the valve element 223, based on the temperature of the engine coolant. In such a case, the horizontal partitioning plate 225 would be moved close to the upper wall of the air intake passage 13 so as to partially close the valve element 223 and produce a strong tumble flow when the coolant temperature is low (i.e., when engine is cool), and the horizontal partitioning plate 225 would be stored in the storage compartment 221 so as to open the valve element 223 and reduce the flow resistance with respect to the intake air when the coolant temperature is high (i.e., when engine is warm).

As a result of the structure of this embodiment, the valve element 223 moves in an interlocking fashion with the horizontal partitioning plate 225 and the opening degree of the valve element 223 can be controlled by moving the horizontal partitioning plate 225 with the partitioning plate moving device in a continuously variable fashion based on the operating conditions of the engine. Since a stable gas flow can be achieved, the exhaust emissions can be greatly reduced and the fuel economy can be improved.

In this embodiment, the inner end 223b (the ends of valve shaft 222) of the valve element 223 is arranged and configured to move along the guide grooves 221a that are provided closely adjacent to a wall of the air intake passage 13 (i.e., in the storage compartment 221) and oriented along the flow direction of the intake air. As a result, a complex linkage mechanism is not needed and the structure is simplified.

In this embodiment, the partitioning plate moving device includes the link member 225a that is fixed to the horizontal partitioning plate 225 and the actuator 224 that is configured and arranged to move the link member 225a in a variable manner along the direction of the longitudinal axis of the link member 225a as mentioned above. As a result, the horizontal partitioning plate 225 can be moved in a stable manner while remaining parallel to the upper wall of the air intake passage 13 (i.e., to the flow direction of the intake air).

Sixth Embodiment

Referring now to FIGS. 16 and 17, an air intake structure is illustrated in accordance with a sixth embodiment. This air intake structure of the sixth embodiment replaces the air intake structure of the first embodiment that is shown in FIG. 1. In other words, the air intake structure of the sixth embodiment is installed in the internal combustion engine of FIG. 1. This air intake structure of the sixth embodiment is most similar to the fifth embodiment. However, this air intake structure of the sixth embodiment uses an air intake control valve 320 having a valve element 320 that is similar to the of the valve element of third embodiment. In view of the similarity between this embodiment and the prior embodiments, the parts of the sixth embodiment that are identical to the parts of the prior embodiments will be given the same reference numerals as the parts of the prior embodiments. Moreover, the descriptions of the parts of the sixth embodiment that are identical to the parts of the prior embodiments may be omitted for the sake of brevity.

As shown in FIG. 16, the air intake control valve 320 (which is swirl control valve in this embodiment) is moveably mounted to the air intake passage 13 for movement between a storage or retracted (open) position within a storage compartment 221 of the air intake passage 13 and an air deflecting or closed position. The air intake control valve 320 has a valve element 323 that is mounted to the valve shaft 222 such that the valve shaft 222 pivotally and slideably supports the valve element 323 in the same manner as the fifth embodiment. Thus, the valve element 323 is preferably has a plate-like member that is fixed to the valve shaft 222 at an inner end 323a thereof. The valve element 323 has an outer end or coupling end 323b with a swirl-producing notch 323c formed on the right side of the centerline (B-B) of the outer end 323b of the valve element 323.

As a result, the valve element 323 has a first free outer edge 323d that is the outer edge of the side of the outer end 323b where the swirl-producing notch 323c is not formed and a second free outer edge 323e that is the outer edge of the side of the outer end 323b where the swirl-producing notch 323c is formed.

As shown in FIG. 16, the horizontal partitioning plate 225 is mounted to the outer end 323b of the valve element 323 (i.e., the second free outer edge 323e) such that the valve element 323 and the horizontal partitioning plate 225 move together between the storage or retracted (open) position within the storage compartment 221 of the air intake passage 13 and the air deflecting or closed position by the actuator 224 of FIG. 14. Thus, the upstream edge of the horizontal partitioning plate 225 is aligned with the second free outer edge 323e that forms the bottom edge of the swirl-producing notch 323c.

The relationship between the opening and closing of the valve element 323 resulting from the vertical positioning of the horizontal partitioning plate 225 and the operating conditions (load) of the engine in this embodiment will now be explained.

When the internal combustion engine is operating in a low rotational speed/low load region or a medium rotational speed/medium load region, the link member 225a is extended in the axial direction thereof such that the horizontal partitioning plate 225 is moved closer to the upper wall of the air intake passage 13 and the valve element 323 is opened only partially. The vertical position of the horizontal partitioning plate 225 under such conditions is determined based on the rotational speed and the load of the engine. FIG. 16 shows an example in which the valve element 323 is closed fully (i.e., set to the maximum slant angle). When the valve element 323 is fully closed, the outer edge 323d of the side of the one end of the valve element 323 where the swirl-producing notch 323c is not formed touches against the upper wall of the air intake passage 13 and the intake air that flows through the swirl-producing notch 323c and into the cylinder 1 forms a strong swirl flow because the horizontal partitioning plate 225 prevents the gas flow from becoming turbulent.

When the internal combustion engine is operating in a high rotational speed/high load region, the link member 225a is retracted in the axial direction thereof such that the horizontal partitioning plate 225 is stored in the storage compartment 221 and the valve element 323 is fully opened. Since the horizontal partitioning plate 225 and the valve element 323 are stored inside the storage compartment 221 formed in the lower wall surface of the air intake passage 13, the flow resistance with respect to the intake air is reduced.

In this embodiment, it is also acceptable to determine the vertical position of the horizontal partitioning plate 225, i.e., the opening degree of the valve element 323, based on the temperature of the engine coolant. In such a case, the horizontal partitioning plate 225 would be moved close to the upper wall of the air intake passage 13 so as to partially close the valve element 323 and produce a strong tumble flow when the coolant temperature is low (i.e., when engine is cool), and the horizontal partitioning plate 225 would be stored in the storage compartment 221 so as to open the valve element 323 and reduce the flow resistance with respect to the intake air when the coolant temperature is high (i.e., when engine is warm).

Seventh Embodiment

Referring now to FIGS. 18 and 19, an air intake structure is illustrated in accordance with a seventh embodiment. This air intake structure of the seventh embodiment replaces the air intake structure of the first embodiment that is shown in FIG. 1. In other words, the air intake structure of the seventh embodiment is installed in the internal combustion engine of FIG. 1. In view of the similarity between this embodiment and the prior embodiments, the parts of the seventh embodiment that are identical to the parts of the prior embodiments will be given the same reference numerals as the parts of the prior embodiments. Moreover, the descriptions of the parts of the seventh embodiment that are identical to the parts of the prior embodiments may be omitted for the sake of brevity.

As shown in FIG. 18, an air intake control valve 420 (which is a tumble control valve in this embodiment) is moveably mounted to the air intake passage 13 for movement between a storage or retracted (open) position within a storage compartment 421 of the air intake passage 13 and an air deflecting or closed position. In particular, the air intake control valve 420 includes a valve shaft 422 that supports a valve element 423. Thus, the air intake control valve 420 is a flap valve in which the valve shaft 422 is arranged in a turnable fashion from a prescribed position within a storage compartment 421 to an extended position that deflects the intake air to one side of the air intake passage 13. The valve element 423 is a rectangular plate-like element that is fixed to the valve shaft 422 at an inner end 423a thereof such it can turn about the axis of the valve shaft

422. An outer end 423b of the valve element 423 is configured to be parallel to the upper wall of the air intake passage 13 and serves to control the gas flow in accordance with the rotational position of the valve element 423.

In this embodiment, a horizontal partitioning plate 425 is mounted to the free end 423b of the valve element 423 such that the valve element 423 and the horizontal partitioning plate 425 move together between the storage or retracted (open) position within the storage compartment 421 of the air intake passage 13 and the air deflecting or closed position. The horizontal partitioning plate 425 is a horizontal plate-like member that is arranged so as to be oriented along the flow direction of the intake air in the air intake passage 13 and configured to have rectifying effect with respect to the flow of the intake air. Thus, the horizontal partitioning plate 425 is coupled at its upstream end to the free end 423b of the valve element 423 of the air intake control valve 420 in a freely pivoting manner. In other words, the free end 423b of the valve element 423 of the air intake control valve 420 is configured for coupling the horizontal partitioning plate 425 thereto. A link member 425a configured to function as a linking mechanism is arranged in such a manner as to maintain the horizontal partitioning plate 425 generally parallel to the upper wall of the air intake passage 13 (intake port 10). In particular, a four bar linkage is formed by the interconnections of the storage compartment 421, the valve element 423, the horizontal partitioning plate 425 and the link member 425a.

The link member 425a has an outer end 425b that is coupled in a freely pivoting manner to the side of the horizontal partitioning plate 425 that is downstream of the valve element 423 of the air intake control valve 420. In other words, the end 425b of the link member 425a is configured as a coupling member for coupling to the other end (i.e., downstream end) of horizontal partitioning plate 425.

The link member 425a is arranged to pivot about an inner end 425c thereof when the valve element 423 of the air intake control valve 420 rotates. Meanwhile, the horizontal partitioning plate 425 moves in such a manner as to remain substantially oriented along the flow direction of the intake air, i.e., parallel to the flow direction of the intake air (i.e., to the upper wall of the air intake passage 13). As shown in FIG. 18, the inner end 425c of the link member 425a is abutted against a step-like part 421a formed in the storage compartment 421.

The linkage mechanism formed by the air intake control valve 420, the horizontal partitioning plate 425, and the link member 425a will now be explained.

As shown in FIG. 18, when the air intake control valve 420 is opened to an intermediate position, the link member 425a is parallel to the valve element 423 of the air intake control valve 420. The length A from the valve shaft 422 of the air intake control valve 420 to the inner end 425c of the link member 425a is equal to the length B from the coupling end 423b between the air intake control valve 420 and the horizontal partitioning plate 425 to the coupling end 425b between the horizontal partitioning plate 425 and the link member 425a (i.e., A=B). Additionally, the length D of the air intake control valve 420 (i.e., length from the valve shaft 422 to the inner end 425c) is equal to the length C of the link member 425a (i.e., length from the end 425b to the inner end 425c) (i.e., C=D).

The valve shaft 422 of the air intake control valve 420 can be turned (rotated) by the actuator 24 (servomotor), which is controlled by the engine control unit 30. Thus, the opening and closing of the air intake passage 13 is controlled by controlling the actuator 24 and, thereby, controlling the rotational position of the valve shaft 422. When the valve shaft 422 is turned, the free end 423b of the valve element 423 of the air intake control valve 420 moves along a circular arc centered on the valve shaft 422.

For example, when the air intake control valve 420 is partially open as shown in FIG. 18, the intake air is directed into the cylinder 1 (see FIG. 1) from the opening section formed between the free end 423b of the valve element 423 of the air intake control valve 420 and the upper wall of the air intake passage 13, thereby producing a tumble flow.

Meanwhile, when the air intake control valve 420 is fully open, i.e., when the valve element 423 of the air intake control valve 420 is positioned so as to be parallel to the air intake passage 13, the valve element 423 is housed in the storage compartment 421. In this state, the flow resistance with respect to the intake air is reduced because the entire air intake control valve 420 is stored inside the storage compartment 421.

When the internal combustion engine is operating in a low rotational speed/low load region or a medium rotational speed/medium load region, the air intake control valve 420 is opened partially. The opening degree of the air intake control valve 420 under such conditions is determined based on the rotational speed and the load. The horizontal partitioning plate 425 moves up and down in accordance with the opening degree of the air intake control valve 420 while remaining parallel to the upper wall of the air intake passage 13 (intake port 10). In other words, since the opening degree of the air intake control valve 420 is determined in a continuously variable fashion based on the operating conditions, the horizontal partitioning plate 425 rectifies the intake air flow from a position corresponding to the operating conditions, enabling appropriate exhaust, fuel consumption, and output to be obtained simultaneously. In particular, the tumble flow can be strengthened in regions of low rotational speed and low load.

When the internal combustion engine is operating in a high rotational speed/high load region, the air intake control valve 420 is opened fully such that the air intake control valve 420, the horizontal partitioning plate 425, and the link member 425a, are stored inside the storage compartment 421 formed in the lower wall face of the air intake passage 13. Under these conditions, the flow resistance with respect to the intake air is reduced.

It is also acceptable to determine the opening degree of the air intake control valve 420 based on the temperature of the engine coolant. In such a case, the air intake control valve 420 would be closed to produce a strong tumble flow when the coolant temperature is low (i.e., when engine is cool) and opened so as to be stored in the storage compartment 421 when the coolant temperature is high (i.e., when engine is warm).

In this embodiment, the link member 425a is arranged in such manner as to be parallel to the valve element 423 of the air intake control valve 420. As a result, the position of the horizontal partitioning plate 425 can be raised and lowered in a stable manner.

In this embodiment, the length A from the valve shaft 422 of the air intake control valve 420 to the inner end 425c of the link member 425a is equal to the length B from the coupling end 423b between the air intake control valve 420 and the horizontal partitioning plate 425 to the coupling end between the horizontal partitioning plate 425 and the link member 425a (i.e., A=B). As a result, a stable linkage mechanism can be achieved.

In this embodiment, the length D of the air intake control valve 420 is equal to the length C of the link member 425*a* (i.e., C=D). As a result, the horizontal partitioning plate 425 can be kept parallel to the upper wall of the air intake passage 13 when it is moved by the linkage mechanism.

Eighth Embodiment

Referring now to FIGS. 20 and 21, an air intake structure is illustrated in accordance with an eighth embodiment. This air intake structure of the eighth embodiment replaces the air intake structure of the first embodiment that is shown in FIG. 1. In other words, the air intake structure of the eighth embodiment is installed in the internal combustion engine of FIG. 1. This air intake structure of the eighth embodiment is most similar to the seventh embodiment. In view of the similarity between this embodiment and the prior embodiments, the parts of the eighth embodiment that are identical to the parts of the prior embodiments will be given the same reference numerals as the parts of the prior embodiments. Moreover, the descriptions of the parts of the eighth embodiment that are identical to the parts of the prior embodiments may be omitted for the sake of brevity.

In the eighth embodiment, the air intake control valve 420 is identical to the seventh embodiment, except for the geometry of the four bar linkage formed by the interconnections of the storage compartment 421, the valve element 423, the horizontal partitioning plate 425 and the link member 425*a*. In particular, in the eighth embodiment, the sum (A+C) of the length C of the link member 425*a* (from the outer end 425*b* to the inner end 425*c*) and the length A from the valve shaft 422 of the air intake control valve 420 to the inner end 425*c* of the link member 425*a* is approximately equal to the sum (B+D) of the length D of the air intake control valve 420 and the length B from the coupling end 423*b* between the air intake control valve 420 and the horizontal partitioning plate 425 to the outer end 425*b* between the horizontal partitioning plate 425 and the link member 425*a* (i.e., A+C≈B+D).

In FIG. 20, the length A from the valve shaft 422 of the air intake control valve 420 to the inner end 425*c* of the link member 425*a* is smaller than the length B from the coupling end 423*b* between the air intake control valve 420 and the horizontal partitioning plate 425 to the outer end 425*b* between the horizontal partitioning plate 425 and the link member 425*a* (i.e., A<B).

Thus, the sum (A+C) of the length C of the link member 425*a* and the length A from the valve shaft 422 of the air intake control valve 420 to the inner end 425*c* of the link member 425*a* is smaller than the sum (B+D) of the length D of the air intake control valve 420 and the length B from the coupling end 423*b* between the air intake control valve 420 and the horizontal partitioning plate 425 to the outer end 425*b* between the horizontal partitioning plate 425 and the link member 425*a* (i.e., A+C<B+D).

The linkage mechanism is thus configured such that the horizontal partitioning plate 425 is farther from the air intake passage 13 (intake port 10) when the air intake control valve 420 is open. This arrangement is particularly useful when the engine is configured such that the bottom wall of the air intake passage 13 is curved because the horizontal partitioning plate 425 can be aligned with the air intake passage 13 when the air intake control valve 420 is open without providing a step-like part.

Although not shown in the figures, it is also acceptable to configure the linkage mechanism such that the sum (A+C) of the length C of the link member 425*a* and the length A from the valve shaft 422 of the air intake control valve 420 to the inner end 425*c* of the link member 425*a* is larger than the sum (B+D) of the length D of the air intake control valve 420 and the length B from the coupling end 423*b* between the air intake control valve 420 and the horizontal partitioning plate 425 to the outer end 425*b* between the horizontal partitioning plate 425 and the link member 425*a* (i.e., A+C>B+D).

In such a case, the linkage mechanism would thus be configured such that the horizontal partitioning plate 425 is pushed toward the upper wall of the air intake passage 13 (intake port 10) when the air intake control valve 420 is open. Such an arrangement is particularly useful when the engine is configured such that the bottom wall of the air intake passage 13 has a straighter shape because the horizontal partitioning plate 425 can be aligned with the air intake passage 13 when the air intake control valve 420 is open without providing a step-like part.

Ninth Embodiment

Referring now to FIGS. 22 and 23, an air intake structure is illustrated in accordance with a ninth embodiment. This air intake structure of the ninth embodiment replaces the air intake structure of the first embodiment that is shown in FIG. 1. In other words, the air intake structure of the ninth embodiment is installed in the internal combustion engine of FIG. 1. This air intake structure of the ninth embodiment uses the valve element of the third and sixth embodiment and the moveable horizontal partitioning plate with the four bar linkage of the seventh embodiment. In view of the similarity between this embodiment and the prior embodiments, the parts of the ninth embodiment that are identical to the parts of the prior embodiments will be given the same reference numerals as the parts of the prior embodiments. Moreover, the descriptions of the parts of the ninth embodiment that are identical to the parts of the prior embodiments may be omitted for the sake of brevity.

In the ninth embodiment, an air intake control valve 520 is the same as the seventh embodiment, except for the valve element 423 has been replaced with the valve element 523 that is identical to the valve element 123 and 323. Thus, in the ninth embodiment, the valve element 523 of the air intake control valve 520 has an inner end 423*a* fixed to the valve shaft 422 and an outer end 523*b* fixed to the horizontal partitioning plate 425. Also the air intake control valve 520 is a swirl control valve having the swirl-producing notch (cut out portion) 523*c* formed on the right side of the outer end 523*b* of the valve element 523. The swirl-producing notch 523*c* is configured so as to provide the valve element 523 with a bottom edge 523*e* and a side edge 523*f*. As shown in FIG. 23, the swirl-producing notch 523*c* is formed on the half of the outer end 523*b* of the valve element 523 located on the right side of the centerline of the valve element 523 (line A-A). The free outermost edge 523*d* of the side of the outer end 523*b* of the valve element 523 where the swirl-producing notch 523*c* is not formed is positioned farther from the valve shaft 422 than the bottom edge 523*e* formed by the swirl-producing valve 520.

The horizontal partitioning plate 425 is coupled in a freely pivoting manner the air intake control valve 520 at a position corresponding to the bottom edge 523*e* formed by the swirl-producing notch 523. A notch (not shown) is provided in the horizontal partitioning plate 425 so that the free outermost edge 523*d* of the side of the outer end 523*b* of the valve element 523 where the swirl-producing notch 523*c* is not formed will not interfere with the horizontal partitioning plate 425 when the air intake control valve 520 is fully open (i.e., when the air intake control valve 520 is stored in the storage compartment 421).

The length A from the valve shaft 422 of the air intake control valve 520 to the inner end 425c of the link member 425a is equal to the length B from the outer end 523b between the air intake control valve 520 and the horizontal partitioning plate 425 to the outer end 425b between the horizontal partitioning plate 425 and the link member 425a (i.e., A=B). Additionally, the length D of the air intake control valve 520 (i.e., length from the valve shaft 422 to the inner end 425c) is equal to the length C of the link member 425a (i.e., length from the end 425b to the inner end 425c) (i.e., C=D). Thus, the sum (A+C) of the length C of the link member 425a and the length A from the valve shaft 422 of the air intake control valve 520 to the inner end 425c of the link member 425a is equal to the sum (B+D) of the length D of the air intake control valve 520 and the length B from the coupling end 523b between the air intake control valve 520 and the horizontal partitioning plate 425 to the outer end 425b between the horizontal partitioning plate 425 and the link member 425a (i.e., A+C=B+D).

The relationship between the opening and closing of the air intake control valve 520 and the load (operating conditions) of the engine in this embodiment will now be explained.

When the engine is operating in a low rotational speed/low load region, the air intake control valve 520 is closed fully (i.e., the air intake control valve 520 is at maximum slant angle). When the air intake control valve 520 is fully closed, the free outermost edge 523d of the side of the outer end 523b of the valve element 523 where the swirl-producing notch 523c is not formed touches against the upper wall of the air intake passage 13. Due to the horizontal partitioning plate 425, the intake air that passes through the swirl-producing notch 523c of the air intake control valve 520 is delivered into the cylinder 1 (see FIG. 1) such that the gas flow becoming turbulent. As a result, a strong swirl flow is produced.

When the engine is operating under in a medium rotational speed/medium load region, the air intake control valve 520 is opened partially (not shown) to an opening degree determined in accordance with the sizes of the rotational speed and the load. As a result, the opening degree of the air intake passage 13 can be varied in a continuously variable manner and turbulent gas flow can be prevented even at intermediate opening degrees of the air intake control valve 520.

When the engine is operating in a high rotational speed/high load region, the air intake control valve 520 is closed fully. When the air intake control valve 520 is fully closed, the air intake control valve 520 (valve element 523) is stored in the storage compartment 421 formed in the bottom wall of the air intake passage 13 and the flow resistance with respect to the intake air is reduced.

Tenth Embodiment

Referring now to FIGS. 24 and 25, an air intake structure is illustrated in accordance with a tenth embodiment. This air intake structure of the tenth embodiment replaces the air intake structure of the first embodiment that is shown in FIG. 1. In other words, the air intake structure of the tenth embodiment is installed in the internal combustion engine of FIG. 1. This air intake structure of the tenth embodiment uses the valve element of the ninth embodiment and the moveable horizontal partitioning plate with the four bar linkage of the eighth embodiment. In view of the similarity between this embodiment and the prior embodiments, the parts of the tenth embodiment that are identical to the parts of the prior embodiments will be given the same reference numerals as the parts of the prior embodiments. Moreover, the descriptions of the parts of the tenth embodiment that are identical to the parts of the prior embodiments may be omitted for the sake of brevity.

Similarly to the case shown in FIG. 20, the air intake control valve 520, as shown in FIG. 24, has a four bar linkage in which the sum (A+C) of the length C of the link member 425a and the length A from the valve shaft 422 of the air intake control valve 520 to the inner end 425c of the link member 425a is approximately equal to the sum (B+D) of the length D of the air intake control valve 520 (from the valve shaft 422 to the coupling end 523b) and the length B from the coupling end 523b between the air intake control valve 520 and the horizontal partitioning plate 425 to the outer end 425b between the horizontal partitioning plate 425 and the link member 425a (i.e., A+C≈B+D) and the length A from the valve shaft 422 of the air intake control valve 520 to the inner end 425c of the link member 425a is smaller than the length B from the coupling end 523b between the air intake control valve 520 and the horizontal partitioning plate 425 to the outer end 425b between the horizontal partitioning plate 425 and the link member 425a (i.e., A<B).

Thus, the sum (A+C) of the length C of the link member 425a and the length A from the valve shaft 422 of the air intake control valve 520 to the inner end 425c of the link member 425a is smaller than the sum (B+D) of the length D of the air intake control valve 520 and the length B from the coupling end 523b between the air intake control valve 520 and the horizontal partitioning plate 425 to the outer end 425b between the horizontal partitioning plate 425 and the link member 425a (i.e., A+C<B+D).

The linkage mechanism is thus configured such that the horizontal partitioning plate 425 is farther from the air intake passage 13 (intake port 10) when the air intake control valve 520 is open. This arrangement is particularly useful when the engine is configured such that the bottom wall of the air intake passage 13 is curved because the horizontal partitioning plate 425 can be aligned with the air intake passage 13 when the air intake control valve 520 is open without providing a step-like part.

Although not shown in the figures, it is also acceptable to configure the linkage mechanism such that the sum (A+C) of the length C of the link member 425a and the length A from the valve shaft 422 of the air intake control valve 520 to the inner end 425c of the link member 425a is larger than the sum (B+D) of the length D of the air intake control valve 520 and the length B from the coupling end 523b between the air intake control valve 520 and the horizontal partitioning plate 425 to the outer end 425b between the horizontal partitioning plate 425 and the link member 425a (i.e., A+C>B+D).

In such a case, the linkage mechanism would thus be configured such that the horizontal partitioning plate 425 is pushed toward the upper wall of the air intake passage 13 (intake port 10) when the air intake control valve 520 is open. Such an arrangement is particularly useful when the engine is configured such that the bottom wall of the air intake passage 13 has a straighter shape because the horizontal partitioning plate 425 can be aligned with the air intake passage 13 when the air intake control valve 520 is open without providing a step-like part.

Eleventh Embodiment

Referring now to FIGS. 26 and 27, an air intake structure is illustrated in accordance with an eleventh embodiment. This air intake structure of the eleventh embodiment replaces the air intake structure of the first embodiment that is shown in FIG. 1. In other words, the air intake structure of the eleventh embodiment is installed in the internal combustion engine of FIG. 1. This air intake structure of the eleventh embodiment has an air intake control valve 520 that is identical to the air intake control valve 520 of the ninth embodiment, except that a moveable vertical partitioning plate 426 has been added and a modified storage compartment 421' is used to accommodate the vertical partitioning plate 426. In view of the similarity between this embodiment and the prior embodiments, the parts of the eleventh embodiment that are identical to the parts of the prior embodiments will be given the same reference numerals as the parts of the prior embodiments. Moreover, the descriptions of the parts of the eleventh embodiment that are identical to the parts of the prior embodiments may be omitted for the sake of brevity.

In the eleventh embodiment, the air intake control valve 520 has the vertical partitioning plate 426 mounted on the outer end 523b of the valve element 523. Thus, the horizontal partitioning plate 425 and vertical partitioning plate 426 move together with the valve element 523. The vertical partitioning plate 426 is arranged to extend along the flow direction of the intake air from the side edge 523f (centerline of valve element 523 (line A-A)) formed by the swirl-producing notch 523c of the valve element 523 of the air intake control valve 520. The vertical partitioning plate 426 turns integrally with the valve element 523 when the valve element 523 turns about the valve shaft 422 (see FIG. 26). The storage compartment 421' is provided with a step portion 421a' as in some of the prior embodiments and a groove 421b' with a shape corresponding to the vertical partitioning plate 426 that serves to store the vertical partitioning plate 426 in the storage compartment 421' when the air intake control valve 520 is fully closed.

Similarly to the case shown in FIG. 14, the length A from the valve shaft 422 of the air intake control valve 520 to the inner end 425c of the link member 425a is equal to the length B from the coupling end 523b between the air intake control valve 520 and the horizontal partitioning plate 425 to the outer end 425b between the horizontal partitioning plate 425 and the link member 425a (i.e., A=B). Additionally, the length D of the air intake control valve 520 (i.e., length from the valve shaft 22 to the inner end 425c) is equal to the length C of the link member 425a (i.e., C=D).

Twelfth Embodiment

Referring now to FIGS. 28 and 29, an air intake structure is illustrated in accordance with a twelfth embodiment. This air intake structure of the twelfth embodiment has an air intake control valve 520 that is identical to the air intake control valve 520 of the tenth embodiment, except that a moveable vertical partitioning plate 426 has been added, similar to the eleventh embodiment. In other words, the air intake control valve 520 that is identical to the air intake control valve 520 of the eleventh embodiment, except that the four bar linkage of this embodiment uses the geometry of the tenth embodiment. Thus, similar to the preceding embodiments, the air intake structure of the twelfth embodiment replaces the air intake structure of the first embodiment that is shown in FIG. 1. In other words, the air intake structure of the twelfth embodiment is installed in the internal combustion engine of FIG. 1. In view of the similarity between this embodiment and the prior embodiments, the parts of the twelfth embodiment that are identical to the parts of the prior embodiments will be given the same reference numerals as the parts of the prior embodiments. Moreover, the descriptions of the parts of the twelfth embodiment that are identical to the parts of the prior embodiments may be omitted for the sake of brevity.

In the twelfth embodiment, the air intake control valve 520 has the vertical partitioning plate 426 mounted on the outer end 523b of the valve element 523, similar to the ninth embodiment. Thus, the horizontal partitioning plate 425 and the vertical partitioning plate 426 move together with the valve element 523.

Similarly to the cases shown in FIGS. 12 and 16, the air intake control valve 520, as shown in FIG. 28, has a four bar linkage in which the sum (A+C) of the length C of the link member 425a and the length A from the valve shaft 422 of the air intake control valve 520 to the inner end 425c of the link member 425a is approximately equal to the sum (B+D) of the length D of the air intake control valve 520 and the length B from the coupling end 523b between the air intake control valve 520 and the horizontal partitioning plate 425 to the outer end 425b between the horizontal partitioning plate 425 and the link member 425a (i.e., A+C≈B+D) and the length A from the valve shaft 422 of the air intake control valve 520 to the inner end 425c of the link member 425a is smaller than the length B from the coupling end 523b between the air intake control valve 520 and the horizontal partitioning plate 425 to the outer end 425b between the horizontal partitioning plate 425 and the link member 425a (i.e., A<B).

Thus, the sum (A+C) of the length C of the link member 425a and the length A from the valve shaft 422 of the air intake control valve 520 to the inner end 425c of the link member 425a is smaller than the sum (B+D) of the length D of the air intake control valve 520 and the length B from the coupling end 523b between the air intake control valve 520 and the horizontal partitioning plate 425 to the outer end 425b between the horizontal partitioning plate 425 and the link member 425a (i.e., A+C<B+D).

The linkage mechanism is thus configured such that the horizontal partitioning plate 425 is farther from the air intake passage 13 (intake port 10) when the air intake control valve 520 is open. This arrangement is particularly useful when the engine is configured such that the bottom wall of the air intake passage 13 is curved because the horizontal partitioning plate 425 can be aligned with the air intake passage 13 when the air intake control valve 520 is open without providing a step-like part.

Although not shown in the figures, it is also acceptable to configure the linkage mechanism such that the sum (A+C) of the length C of the link member 425a and the length A from the valve shaft 422 of the air intake control valve 520 to the inner end 425c of the link member 425a is smaller than the sum (B+D) of the length D of the air intake control valve 520 and the length B from the coupling end 523b between the air intake control valve 520 and the horizontal partitioning plate 425 to the outer end 425b between the horizontal partitioning plate 425 and the link member 425a (i.e., A+C>B+D).

In such a case, the linkage mechanism would thus be configured such that the horizontal partitioning plate 425 is pushed toward the upper wall of the air intake passage 13 (intake port 10) when the air intake control valve 520 is open. Such an arrangement is particularly useful when the engine is configured such that the bottom wall of the air intake passage 13 has a straighter shape because the horizontal partitioning plate 425 can be aligned with the air intake passage 13 when the air intake control valve 520 is open without providing a step-like part.

Thirteenth Embodiment

Referring now to FIGS. 30 to 32, an air intake structure is illustrated in accordance with a thirteenth embodiment. This air intake structure of the thirteenth embodiment replaces the air intake structure of the first embodiment that is shown in FIG. 1. In other words, the air intake structure of the thirteenth embodiment is installed in the internal combustion engine of FIG. 1. In view of the similarity between this embodiment and the prior embodiments, the parts of the thirteenth embodiment that are identical to the parts of the prior embodiments will be given the same reference numerals as the parts of the prior embodiments. Moreover, the descriptions of the parts of the thirteenth embodiment that are identical to the parts of the prior embodiments may be omitted for the sake of brevity.

As shown in FIGS. 30 and 31, an air intake control valve 620 (which is a tumble control valve in this embodiment) is moveably mounted to the air intake passage 13 for movement between a storage or retracted (open) position within a storage compartment 621 of the air intake passage 13 and an air deflecting or closed position, similar to the first embodiment. In particular, the air intake control valve 620 includes a valve shaft 622 that supports a rectangular plate-like valve element 623. Thus, the air intake control valve 620 is a flap valve having the valve shaft 622 arranged in a turnable fashion in a prescribed position of the storage compartment 621 with the valve element 623 being fixed to the valve shaft 622 at inner end 623a. Thus, the valve element 623 can turn about the axis of the valve shaft 622 with an outer end 623b moving a long a circular path. The valve shaft 622 is arranged closely adjacent to the bottom wall of the rectangular air intake passage 13 and is oriented to be perpendicular to the flow direction of the intake air. The outer end 623b of the valve element 623 is configured to be parallel to the upper wall of the air intake passage 13 and serves to control the gas flow in accordance with the rotational position of the valve element 623.

A horizontal partitioning plate 625 is arranged so as to be oriented along the flow direction of the intake air in the air intake passage 13. The horizontal partitioning plate 625 is configured to have rectifying effect with respect to the flow of the intake air. The horizontal partitioning plate 625 is coupled at one end to the outer end 623b of the valve element 623 of the air intake control valve 620 in a freely pivoting manner. In other words, the outer end 623b of the valve element 623 of the air intake control valve 620 is configured as a coupling member for coupling with the upstream end of the horizontal partitioning plate 625.

The valve shaft 622 of the air intake control valve 620 can be turned (rotated) by the actuator 24 (servomotor) in the same manner as the first embodiment of FIG. 1. Thus, the opening and closing of the air intake passage 13 is controlled by controlling the actuator 24 and, thereby, controlling the rotational position of the valve element 623. When the valve shaft 622 is turned, the outer end 623b of the valve element 623 of the air intake control valve 620 moves along a circular arc centered on the valve shaft 622.

For example, when the air intake control valve 620 is partially open as shown in FIG. 30, the intake air is directed through the opening formed between the outer end 623b of the valve element 623 of the air intake control valve 620 and the upper wall of the air intake passage 13. The intake air is rectified by the horizontal partitioning plate 625 and the upper wall of the air intake passage 13 and thus produces a strong tumble flow when it enters the cylinder 1.

Meanwhile, when the air intake control valve 620 is fully open, i.e., when the valve element 623 of the air intake control valve 620 is positioned so as to be parallel to the air intake passage 13, the valve element 623 is housed in the storage compartment 621. In this state, the flow resistance with respect to the intake air is reduced because the valve element 623 and the horizontal partitioning plate 625 are both stored inside the storage compartment 621.

The horizontal partitioning plate 625 has a pair of laterally extending pins or guide parts 625a that are configured and arranged such that a portion thereof protrudes in the widthwise direction. The guide parts 625a are provided on the horizontal partitioning plate 625 at a position downstream of the connection to the valve element 623 of the air intake control valve 620 (see FIG. 31). The guide parts 625a fit into a pair of sliding grooves 13a formed in the lateral side walls of the air intake passage 13. The guide parts 625a can move in a sliding fashion along the inside of the sliding grooves 13a.

As shown in FIG. 30, each of the sliding grooves 13a has a generally S-shape comprising an arc that corresponds to the rotational path of the outer end 623b of the valve element 623 of the air intake control valve 620. This arc of the sliding grooves 13a is separated from the rotational path along a direction parallel to the flow direction of the intake air. A bottom arc portion 13a' of the arc of the sliding grooves 13a bulges toward the center of the arc. In other words, the bottom arc portion 13a' of the sliding grooves 13a, i.e., a portion of the sliding grooves 13a located toward the bottom wall of the air intake passage 13, is shaped so as to approach closer to the rotational path of the outer end 623b of the valve element 623 of the air intake control valve 620 than the rest of the sliding grooves 13a.

The sliding grooves 13a are configured such that when the air intake control valve 620 is partially open, the guide parts 625a of the horizontal partitioning plate 625 are guided in a freely sliding manner such that the horizontal partitioning plate 625 is arranged generally parallel to the flow direction of the intake air.

More specifically, the sliding grooves 13a is formed to curve smoothly in an S-like shape along its length. When the valve element 623 of the air intake control valve 620 is rotated to a position where the air intake passage 13 is more than halfway closed, the horizontal partitioning plate 625 is arranged parallel to the upper wall of the air intake passage 13. In other words, the sliding grooves 13a are curved grooves that are spaced downstream of a rotational path of an outer end 623b of the valve element 623 along a direction parallel to the intake air flow direction. Each of the sliding grooves 13a includes an upper arc portion and the bottom arc portion 13a' with the upper arc portion having a curvature corresponding to a curvature of the rotational path of the outer end 623b of the valve element 623, the bottom arc portion 13a' bulging toward a center of the upper arc portion.

When the valve element 623 of the air intake control valve 620 is rotated to a position more than halfway open (i.e., a position where the horizontal partitioning plate 625 is close to the bottom wall of the air intake passage 13), the sliding grooves 13a guides the guide parts 625a of the horizontal partitioning plate 625 such that the guide parts 625a move closer to the rotational path of the outer end 623b of the valve element 623 of the air intake control valve 620 (i.e., moves in the upstream direction of the air intake passage 13). In this state, the horizontal partitioning plate 625 is slanted such that its downstream end is closer to the bottom wall of the air intake passage 13 than its upstream end.

Additionally, since the bottom arc portion 13a' of the sliding grooves 13a are slanted so as to become more and more oriented toward the downstream direction of the intake air flow as one approaches the bottom wall of the air intake passage 13, both the air intake control valve 620 and the horizontal partitioning plate 625 are stored inside the storage compartment 621 when the valve element 623 of the air intake control valve 620 is rotated in the fully open direction to such a position that it is parallel to the upper wall of the air intake control passage 13.

Meanwhile, when the valve element 623 of the air intake control valve 620 is rotated from the storage compartment 621 (i.e., a fully open state) to a position where it partially closes the air intake passage 13, the resistance opposing the rising up of the horizontal partitioning plate 625 (particularly the initial stage of rising up) is reduced because the bottom arc portion 13a' of the sliding grooves 13a, which is the initial portion along which the guide parts 625a of the horizontal partitioning plate 625 slides, is formed to have an acute angle.

As in all of the prior embodiments, various sensors are also provided to detect the operating conditions of the engine such as the ones shown in FIG. 1, as discussed above. The output signals of these sensors are fed to the engine control unit 30, which controls the actuator 24 to operate the air intake control valve 620 to the appropriate position based on various computations and control operations relating to the engine operating conditions.

The relationship between the opening and closing of the air intake control valve 620 and the operating conditions (load) of the engine in this embodiment will now be explained.

When the internal combustion engine is operating in a low rotational speed/low load region or a medium rotational speed/medium load region, the air intake control valve 620 is opened partially. The opening degree of the air intake control valve 620 under such conditions is determined based on the rotational speed and the load. The guide parts 625a slide along inside the sliding grooves 13a such that the horizontal partitioning plate 625 moves up and down in accordance with the opening degree of the air intake control valve 620 while remaining parallel to the upper wall of the air intake passage 13 (intake port 10). Since the opening degree of the air intake control valve 620 is determined in a continuously variable fashion based on the operating conditions, the horizontal partitioning plate 625 is arranged in a position corresponding to the operating conditions, enabling appropriate exhaust, fuel consumption, and output to be obtained simultaneously. In particular, the tumble flow can be strengthened in regions of low rotational speed and low load.

When the internal combustion engine is operating in a high rotational speed/high load region, the air intake control valve 620 is opened fully such that the air intake control valve 620, the horizontal partitioning plate 625, and the guide parts 625a are stored inside the storage compartment 621 formed in the bottom wall of the air intake passage 13. Under these conditions, the flow resistance with respect to the intake air is reduced.

It is also acceptable to determine the opening degree of the air intake control valve 620 based on the temperature of the engine coolant. In such a case, the air intake control valve 620 would be closed to produce a strong tumble flow when the coolant temperature is low (i.e., when engine is cool) and opened so as to be stored in the storage compartment 621 when the coolant temperature is high (i.e., when engine is warm).

Although in this embodiment the bottom arc portion 13a' of the sliding grooves 13a is slanted so as to become more and more oriented toward the downstream direction of the intake air flow as one approaches the bottom wall of the air intake passage 13, thereby reducing the initial resistance opposing the rising up of the horizontal partitioning plate 625 when the valve element 623 of the air intake control valve 620 is rotated from the storage compartment 621 (i.e., a fully open state) to a position where it partially closes the air intake passage 13, the present invention is not limited to such a configuration.

In particular, it is also acceptable to configure the air intake control valve 620 such that the valve shaft 622 and the planar surface of the valve element 623 that faces the valve shaft 622 are offset from each other by a distance D as shown in FIG. 32. This can be accomplished by configuring the valve element 623 such that the inner end 623a (i.e., the end close to the bottom wall of the air intake passage 13) is bent at an approximately right angle as shown in FIG. 32. By configuring the bottom arc portion 13a' of the sliding grooves 13a to make an angle θ of 90° or less with respect to the bottom wall of the air intake passage 13, the horizontal partitioning plate 625 will lift up when the valve element 623 is rotated. As a result, the position of the horizontal partitioning plate 625 varies in accordance with the rotational position of the valve element 623 of the air intake control valve 620 and, thus, the intake air flow can be rectified efficiently even when the air intake control valve 620 is controlled in a continuously variable manner.

In this embodiment, the valve shaft 622 and the plane containing the valve element 623 are offset from each other. As a result, when the valve element 623 of the air intake control valve 620 is rotated from the storage compartment 621 (i.e., a fully open state) to a position where it partially closes the air intake passage 13, the resistance opposing the initial rising up of the guide parts 625a of the horizontal partitioning plate 625 is reduced.

Fourteenth Embodiment

Referring now to FIGS. 33 and 34, an air intake structure is illustrated in accordance with a fourteenth embodiment. This air intake structure of the fourteenth embodiment has an air intake control valve 720 that is identical to the air intake control valve 620 of the thirteen embodiment, except that a swirl type valve element is used, similar to the eleventh and twelfth embodiments. Thus, similar to the preceding embodiments, the air intake structure of the fourteenth embodiment replaces the air intake structure of the first embodiment that is shown in FIG. 1. In other words, the air intake structure of the fourteenth embodiment is installed in the internal combustion engine of FIG. 1. In view of the similarity between this embodiment and the prior embodiments, the parts of the fourteenth embodiment that are identical to the parts of the prior embodiments will be given the same reference numerals as the parts of the prior embodiments. Moreover, the descriptions of the parts of the fourteenth embodiment that are identical to the parts of the prior embodiments may be omitted for the sake of brevity.

In this fourteenth embodiment, as shown in FIG. 34, the air intake control valve 720 is attached to the horizontal partitioning plate 625 as in the thirteenth embodiment. However, the air intake control valve 720 of the fourteenth embodiment is configured as a swirl control valve. Thus, the air intake control valve 720 has a valve element 723 with an inner end 723*a* fixed to the valve shaft 622 and an outer end 732*b* with a swirl-producing notch 723*c* formed therein. The swirl-producing notch 723*c* is formed on the half of the outer end 723*b* of the valve element 723 located on the right side of the centerline of the valve element 723 (line A-A) such that the air intake control valve 720 has a first outer edge 723*d* that is the outer edge of the side of the outer end 723*b* of the valve element 723 where the swirl-producing notch 723*c* is not formed and a second outer edge 723*e* that is the outer edge of the side of the outer end 723*b* of the valve element 723 where the swirl-producing notch 723*c* is formed.

The relationship between the opening and closing of the air intake control valve 720 and the load (operating conditions) of the engine in this embodiment will now be explained.

When the engine is operating in a low rotational speed/low load region, the air intake control valve 720 is closed fully (i.e., the air intake control valve 720 is at the maximum slant angle). When the air intake control valve 720 is fully closed, the outer edge 723*d* of the side of the outer end 723*b* of the valve element 723 where the swirl-producing notch 723*c* is not formed touches against the upper wall of the air intake passage 13. Due to the horizontal partitioning plate 625, the intake air that passes through the swirl-producing notch 723*c* of the air intake control valve 720 is delivered into the cylinder 1 without the gas flow becoming turbulent. As a result, a strong swirl flow is produced.

When the engine is operating in a medium rotational speed/medium load region, the air intake control valve 720 is opened partially (indicated with a broken line) to an opening degree determined in accordance with the sizes of the rotational speed and the load. As a result, the opening degree of the air intake passage 13 can be varied in a continuously variable manner and turbulent gas flow can be prevented even at intermediate opening degrees of the air intake control valve 720.

When the engine is operating in a high rotational speed/high load region, the air intake control valve 720 is closed fully. When the air intake control valve 720 is fully closed, the air intake control valve 720 (valve element 723) is stored in the storage compartment 721 formed in the bottom wall of the air intake passage 13 and the flow resistance with respect to the intake air is reduced.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An internal combustion engine air intake structure comprising:
    an air intake passage having an internal passage wall defining an open cross sectional area of the air intake passage in a plane perpendicular to an intake air flow direction;
    an air intake control valve disposed in the air intake passage to selectively move between at least a retracted position, a first intake air deflecting position and a second intake air deflecting position, with the cross sectional area of the air intake passage being effectively reduced in the first and second intake air deflecting positions relative to the retracted position so as to increase flow of intake air on a combustion chamber side of the air intake control valve in the air intake passage; and
    an intake air flow partitioning unit disposed in the air intake passage and arranged to cooperate with the air intake control valve to at least selectively maintain a first substantially constant reduced cross sectional area downstream of the air intake control valve when the air intake control valve is in the first intake air deflecting position and a second substantially constant reduced cross sectional area downstream of the air intake control valve when the air intake control valve is in the second intake air deflecting position, with first and second substantially constant reduced cross sectional areas being in a range of one half or less of the open cross sectional area of the air intake passage.

2. The internal combustion engine air intake structure recited in claim 1, wherein
    the air intake control valve includes a valve element rotatably supported at an inner end about a rotational axis that is located one side of the intake passage in a position closely adjacent to the internal passage wall of the air intake passage, with an outer end of the valve element disposed adjacent an upstream end of the intake air flow partitioning unit such that the inner end of the valve element is disposed further upstream than the outer end of the valve element to form a substantially continuous contour between an upstream surface of the valve element and the intake air flow partitioning unit when in the first and second intake air deflecting positions.

3. The internal combustion engine air intake structure recited in claim 1, wherein
    the intake air flow partitioning unit includes at least first and second partitioning members extending along the intake air flow direction, with the first and second partitioning members being fixed within the air intake passage in positions corresponding to the first and second substantially constant reduced cross sectional areas, respectively.

4. The internal combustion engine air intake structure recited in claim 1, wherein
    the intake air flow partitioning unit includes a honeycomb-like structure configured and arranged to extend along the intake air flow direction.

5. The internal combustion engine air intake structure recited in claim 1, wherein
    the intake air flow partitioning unit includes a partitioning member attached at an upstream part to the air intake control valve at a connection point such that the partitioning member and the air intake control valve move together when moved between any two positions among the retracted position, the first intake air deflecting position and the second intake air deflecting position, and the partitioning member is supported by a first end of a link member at in a freely pivoting manner to define an outer pivot axis, with the link member being configured to maintain the partitioning member substantially oriented parallel to the intake air flow direction when the air intake control valve is moved between one of the retracted position, the first intake air deflecting position and the second intake air deflecting position.

6. The internal combustion engine air intake structure recited in claim 5, wherein the rotational axis of the air intake control valve is spaced from the inner pivot axis of the link member by a first length that is substantially equal to a second length between the connection point formed between the valve element and the partitioning member and the outer pivot axis formed between the partitioning member and the link member, and the valve element has a length as measured between the rotational axis of the air intake control valve and the partitioning member that is substantially equal to a length of the link member as measured between the outer pivot axis formed between the partitioning member and the link member and the inner pivot axis of the link member.

7. The internal combustion engine air intake structure recited in claim 5, wherein the rotational axis of the air intake control valve is spaced from the inner pivot axis of the link member by a first length that is shorter than a second length between the connection point formed between the valve element and the partitioning member and the outer pivot axis formed between the partitioning member and the link member.

8. The internal combustion engine air intake structure recited in claim 5, wherein the rotational axis of the air intake control valve is spaced from the inner pivot axis of the link member by a first length, the connection point formed between the valve element and the partitioning member is spaced from the outer pivot axis formed between the partitioning member and the link member by a second length, the link member has a length of as measured between the outer pivot axis formed between the partitioning member and the link member and the inner pivot axis of the link member, the valve element has a length as measured between the rotational axis of the air intake control valve and the partitioning member, and the sum of the length of the link member and the length between the rotational axis of the air intake control valve and the inner pivot axis of the link member is smaller than the sum of the length of the valve element and the length between the outer pivot axis and the connection point formed between the valve element and the partitioning member.

9. The internal combustion engine air intake structure recited in claim 1, wherein the air intake control valve includes a valve element rotatably supported at an inner end about a rotational axis, the intake air flow partitioning unit includes a partitioning member attached at an upstream part to the valve element at a connection point such that the partitioning member and the valve element move together when moved between any two positions among the retracted position, the first intake air deflecting position and the second intake air deflecting position, and the partitioning member has a pair of guide parts and the internal passage wall has a pair of sliding grooves with the guide parts of the partitioning member being supported in the sliding grooves to move between the retracted position, the first intake air deflecting position and the second intake air deflecting position.

10. The internal combustion engine air intake structure recited in claim 9, wherein the sliding grooves are curved grooves that are spaced downstream of a rotational path of an outer end of the valve element along a direction parallel to the intake air flow direction, each of the sliding grooves includes an upper arc portion and a bottom arc portion with the upper arc portion having a curvature corresponding to a curvature of the rotational path of the outer end of the valve element, the bottom arc portion bulging toward a center of the upper arc portion.

11. The internal combustion engine air intake structure recited in claim 9, wherein the valve element and the partitioning member are configured and arranged such that a straight line connecting the connection point formed between the valve element and the partitioning member and the guide parts of the partitioning member is oriented in a non-intersecting relationship with respect to the rotational axis of the valve element during movement of the valve element and the partitioning member between any two positions among the retracted position, the first intake air deflecting position and the second intake air deflecting position.

12. The internal combustion engine air intake structure recited in claim 1, wherein the air intake control valve includes a valve element rotatably supported at an inner end about a rotational axis, the intake air flow partitioning unit includes a partitioning member attached at an upstream part to the valve element at a connection point such that the partitioning member and the valve element move together when moved between any two positions among the retracted position, the first intake air deflecting position and the second intake air deflecting position, and the partitioning member is movably supported by a partitioning plate moving device, with the partitioning plate moving device being configured to maintain the partitioning member substantially oriented parallel to the intake air flow direction when the air intake control valve is moved between any two positions among the retracted position, the first intake air deflecting position and the second intake air deflecting position.

13. The internal combustion engine air intake structure recited in claim 12, wherein the valve element is configured and arranged relative to the internal passage wall such that the inner end of the valve element moves along the intake air flow direction when the valve element is moved between any two positions among the retracted position, the first intake air deflecting position and the second intake air deflecting position.

14. The internal combustion engine air intake structure recited in claim 12, wherein the partitioning plate moving device includes a link member fixed at one end to the partitioning member.

15. A method of controlling intake air flow in an engine air intake passage comprising:

detecting an engine operating condition of an internal combustion engine;

selectively controlling intake control valve to deflect the intake air flowing in the engine air intake passage toward one side of the engine air intake passage by reducing a total open cross sectional area of the air intake passage to one of a first substantially constant reduced cross sectional area in a range of one half or less of the total open cross sectional area of the air intake passage to increase the intake air flowing to a combustion chamber of the internal combustion engine to a first level upon detecting a first engine operating condition of the internal combustion engine, and a second substantially constant reduced cross sectional area in a range of one half or less of the total open cross sectional area of the air intake passage to increase the intake air flowing to the combustion chamber of the internal combustion engine to a second level upon detecting a second engine operating condition of the internal combustion engine, and selectively maintaining the first and second substantially constant cross sectional area reduction ratios downstream of the air intake control valve along the air intake passage to a vicinity of the combustion chamber upon detecting the first and second engine operating conditions, respectively.

\* \* \* \* \*